United States Patent
Veitch et al.

(10) Patent No.: US 7,152,077 B2
(45) Date of Patent: Dec. 19, 2006

(54) SYSTEM FOR REDUNDANT STORAGE OF DATA

(75) Inventors: Alistair Veitch, Mountain View, CA (US); Svend Frolund, Mountain View, CA (US); Arif Merchant, Los Altos, CA (US); Susan Spence, San Jose, CA (US); Yasusuhi Saito, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 470 days.

(21) Appl. No.: 10/440,531

(22) Filed: May 16, 2003

(65) Prior Publication Data
US 2004/0230596 A1    Nov. 18, 2004

(51) Int. Cl.
*G06F 17/30* (2006.01)
(52) U.S. Cl. .................. 707/203; 707/204; 707/205; 714/6
(58) Field of Classification Search ............. 707/204, 707/203, 205; 715/511; 714/6
See application file for complete search history.

(56) References Cited

U.S. PATENT DOCUMENTS

| | | | |
|---|---|---|---|
| 4,714,996 A * | 12/1987 | Gladney et al. ........... | 707/203 |
| 5,212,788 A | 5/1993 | Lomet et al. | |
| 5,430,869 A | 7/1995 | Ishak et al. | |
| 5,452,445 A | 9/1995 | Hallmark et al. | |
| 5,504,900 A | 4/1996 | Raz | |
| 5,546,582 A | 8/1996 | Brockmeyer et al. | |
| 5,644,763 A | 7/1997 | Roy | |
| 5,701,480 A | 12/1997 | Raz | |
| 5,768,538 A | 6/1998 | Badovinatz et al. | |
| 5,799,305 A | 8/1998 | Bortvedt et al. | |
| 5,920,857 A | 7/1999 | Rishe et al. | |
| 5,953,714 A | 9/1999 | Abdullah | |
| 6,052,712 A | 4/2000 | Badovinatz et al. | |
| 6,148,295 A | 11/2000 | Megiddo et al. | |

(Continued)

FOREIGN PATENT DOCUMENTS

EP     1160682     5/2001

OTHER PUBLICATIONS

Barbara Liskov, Sanjay Ghemawat, Robert Gruber, Paul Johnson, Liuba Shrira, Michael Williams, Replication in the Harp File System, Proceedings of the Thirteenth ACM Symposium on Operating Systems Principles, Oct. 13-16, 1991, Asilomar Conference Center, Pacific Grove, CA, pp. 226-238, ACM Press, New York, 1991.

(Continued)

*Primary Examiner*—Jeffrey Gaffin
*Assistant Examiner*—Monica Pyo

(57) ABSTRACT

Data structure and timestamp management techniques for redundant storage. A plurality of storage devices are interconnected by a communication medium. At least two of the storage devices are designated devices for storing a block of data. Each designated device stores a version of the data and a first timestamp that is indicative of when the version of data was last updated. A second timestamp is indicative of a pending update to the block of data. When the update to the block of data is completed at one of the designated devices, the device discards the second timestamp. A storage device acting as coordinator instructs the device to discard the second timestamp. The designated storage devices store a plurality of blocks of data and corresponding timestamps according to a data structure. At least some of the entries in the data structure correspond to a range of data blocks that share a common timestamp. Entries in the data structure are arranged such that the ranges do not overlap.

17 Claims, 14 Drawing Sheets

U.S. PATENT DOCUMENTS

| | | | |
|---|---|---|---|
| 6,219,667 | B1 | 4/2001 | Lu et al. |
| 6,421,688 | B1 | 7/2002 | Song |
| 2005/0108302 | A1* | 5/2005 | Rand et al. .................. 707/204 |

OTHER PUBLICATIONS

Edward K. Lee, Chandramohan A. Thekkath, Petal: Distributed Virtual Disks, ASPLOS-VII Proceedings / Seventh International Conference on Architectural Support for Programming Languages and Operating Systems, Cambridge, Massachusetts, Oct. 1-5, 1996, pp. 84-92, ACM Press, New York, 1996.

Leslie Lamport, The Part-Time Parliament, ACM Transactions on Computer Systems, vol. 16, No. 2, pp. 133-169, ACM Press, New York, 1998.

Hagit Attiya, Amotz Bar-Noy, Danny Dolev, Sharing Memory Robustly in Message-Passing Systems, Proceedings of the Ninth Annual ACM Symposium on Principles of Distributed Computing: Quebec City, Quebec, Canada, Aug. 22-24, 1990, pp. 363-375, ACM Press, New York, 1990.

Nancy A. Lynch, Alexander A. Shvartsman, Robust Emulation of Shared Memory using Dynamic Quorum-Acknowledged Broadcasts, International Symposium on Fault-Tolerant Computing 1997: Seattle, Washington, pp. 272-281, IEEE Computer Society Press, Los Alamitos, 1997.

Garth R. Goodson, Jay J. Wylie, Gregory R. Ganger, Michael K. Reiter, Decenteralized Storage Consistency via Versioning Servers, Carnegie-Mellon University Technical Report CMU-CS-02-180 Carnegie-Mellon University, ECE Department, Pittsburgh, Sep. 2002. < http://www.pdl.cmu.edu/PDL-FTP/PASIS/CMU-CS-02-180.pdf>.

Khalil Amiri, Garth Gibson, Richard Golding, Highly Concurrent Shared Storage, 20th International Conference on Distributed Computing Systems: proceedings: Taipei, Taiwan, Apr. 10-13, 2000, pp. 298-307, IEEE Computer Society, Los Alamitos, 2000.

Hans-Peter Kriegel, Marco Potke, Thomas Seidl, Managing Intervals Efficiently in Object-Relational Databases, Marking the millennium: 26th International Conference on Very Large Databases, Cairo, Egypt, Sep. 10-14, 2000, pp. 407-418, Morgan Kaufmann, Orlando, 2000.

Steven Berson, R. R. Muntz, W. R. Wong, Randomized Data Allocation for Real-time Disk I/O, Digest of papers: Compcon '96; technologies for the information superhighway, Feb. 25-28, 1996, Santa Clara, CA, pp. 286-290, IEEE Computer Society, Los Alamitos, 1996.

Steven Hand, Timothy Roscoe, Mnemosyne: Peer-to-Peer Steganographic Storage, Peer-to-peer systems: First International Workshop, IPTPS 2002, Cambridge, MA, USA, Mar. 7-8, 2002: revised papers, Springer, New York, 2002.

Hui-I Hsiao, Chained Declustering: A New Availability Strategy for Multiprocessor Database machines, Data engineering: proceedings / Sixth International Conference on Data Engineering, Feb. 5-9, 1990, Los Angeles Airport Hilton and Towers, Los Angeles, California, USA, pp. 456-465, IEEE Computer Society Press, Los Alamitos, 1990.

Arif Merchant, Phillip S. Yu, Analytic modeling of Clustered RAID with Mapping Based on Nearly Random Permutation, IEEE transactions on Computers, vol. 45, No. 3, Mar. 1996, pp. 367-373, IEEE Computer Society Press, Los Alamitos, 1996.

Gabriel Mizrahi, The Hashing Approch to the Internet File System Problem, M. A. Thesis, Department of Mathematics, University of Hafia, Isreal, Nov. 2001.

Jose Renato Santos, R. R. Muntz, B. Ribeiro-Neto, Comparing Random Data Allocation and Data Striping in Multimedia Servers, Proceedings ACM SIGMETRIC '2000: International Conference on Measurement and Modeling of Computer Systems, Jun. 17-21, 2000, Santa Clara, CA, USA, pp. 44-55 ACM Press, New York, 2000.

Avishai Wool, Quorum Systems in Replicated Databases: Science or Fiction?, Bulletin of the IEEE Computer Society Technical Committee on Data Engineering, vol. 21, No. 4, Dec. 1998, pp. 3-11, IEEE Computer Society Press, Los Alamitos, 1998.

Robert H. Thomas, A Majority Consensus Approach to Concurrency Control for Multiple Copy Databases, ACM Transactions on Database Systems (TODS), vol. 4, No. 2, Jun. 1979, pp. 180-209, ACM Press, New York, 1979.

Hagit Attiya, Amotz Bar-Noy, Danny Dolev, Sharing memory robustly in message-passing systems, vol. 42, No. 1, Jan. 1995, pp. 124-142, Journal of the ACM (JACM), ACM Press, New York, 1995.

* cited by examiner

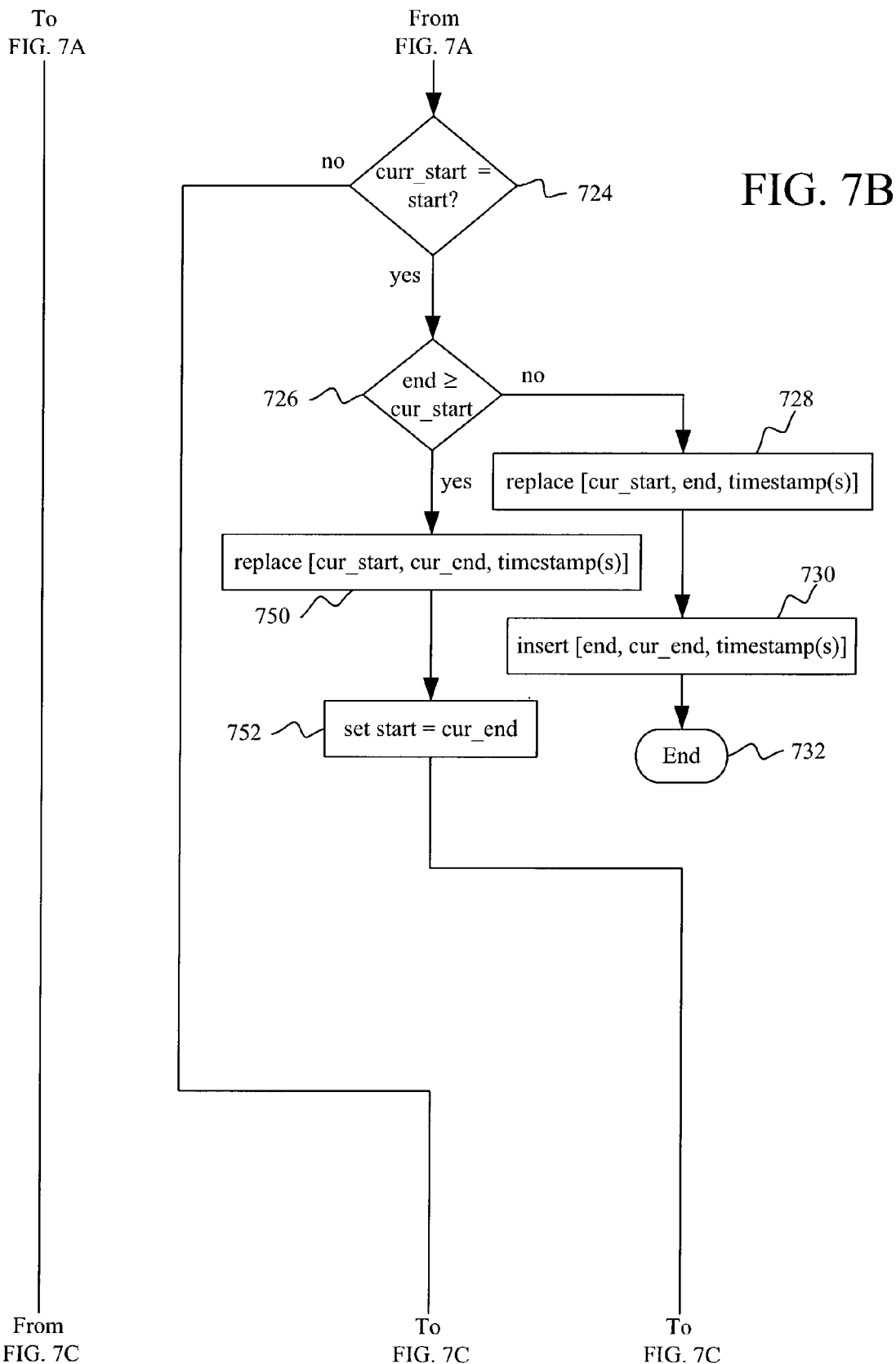

S = CS

S = CS

SYSTEM FOR REDUNDANT STORAGE OF DATA

This application is related to U.S. application Ser. Nos. 10/440,570 and 10/440,548, filed, May 16, 2003, the contents of which are hereby incorporated by reference.

FIELD OF THE INVENTION

The present invention relates to the field of data storage and, more particularly, to fault tolerant data replication.

BACKGROUND OF THE INVENTION

Enterprise-class data storage systems differ from consumer-class storage systems primarily in their requirements for reliability. For example, a feature commonly desired for enterprise-class storage systems is that the storage system should not lose data or stop serving data in circumstances that fall short of a complete disaster. To fulfill these requirements, such storage systems are generally constructed from customized, very reliable, hot-swappable hardware components. Their firmware, including the operating system, is typically built from the ground up. Designing and building the hardware components is time-consuming and expensive, and this, coupled with relatively low manufacturing volumes is a major factor in the typically high prices of such storage systems. Another disadvantage to such systems is lack of scalability of a single system. Customers typically pay a high up-front cost for even a minimum disk array configuration, yet a single system can support only a finite capacity and performance. Customers may exceed these limits, resulting in poorly performing systems or having to purchase multiple systems, both of which increase management costs.

It has been proposed to increase the fault tolerance of off-the-shelf or commodity storage system components through and the use of data replication. However, this solution requires coordinated operation of the redundant components and synchronization of the replicated data.

Therefore, what is needed are improved techniques for storage environments in which redundant devices are provided or in which data is replicated. It is toward this end that the present invention is directed.

SUMMARY OF THE INVENTION

The present invention provides data structure and timestamp management techniques for redundant storage. In one aspect, a plurality of storage devices are interconnected by a communication medium. At least two of the storage devices are designated devices for storing a block of data. Each designated device stores a version of the data and a first timestamp that is indicative of when the version of data was last updated and a second timestamp that is indicative of a pending update to the block of data. When the update to the block of data is completed at one of the designated devices, the device discards the second timestamp. One of the storage devices may act as coordinator for a data update operation and instructs the device to discard the second timestamp. The designated storage devices may each store a plurality of blocks of data and corresponding timestamps according to a data structure. At least some of the entries in the data structure may correspond to a range of data blocks that share a common timestamp. In which case, each designated storage device inserts entries into the data structure such that the ranges do not overlap.

In another aspect, an entry is added to a data structure having a plurality of entries, in which at least some of the entries corresponding to a range of elements that share a common attribute. A position in the data structure for insertion of the entry may be identified, the entries being ordered in the data structure according to the key. If an existing entry in the data structure has a range that does not overlap the range of the entry to be added, the entry is inserted at the identified position. If an existing entry in the data structure has a range that overlaps the range of the entry to be added, the existing entry is replaced with one or more new entries including a new entry for any portion of the range of the existing entry that is not overlapped by the entry to be added and at least one entry for the portion of the range of the entry to be added that overlaps the range of the existing entry. The new entry for the portion of the existing entry not overlapped has the common attribute of the existing entry, while the new entry for the portion that overlaps has the common attribute of the entry to be added. The elements may include redundantly stored data blocks and the common attribute shared by the redundantly stored data blocks may includes a timestamp that indicates when the corresponding redundantly stored data blocks were last updated.

These and other aspects of the invention are explained in more detail herein.

BRIEF DESCRIPTION OF THE DRAWINGS

FIGS. 7A–C illustrate a flow diagram of a method for maintaining the data structure of FIG. 6 in accordance with an embodiment of the present invention;

DETAILED DESCRIPTION OF A PREFERRED EMBODIMENT

The present invention provides improved techniques for storage environments in which redundant devices are provided or in which data is replicated. An array of storage devices provides reliability and performance of enterprise-class storage systems, but at lower cost and with improved scalability. Each storage device may be constructed of commodity components while their operation is coordinated in a decentralized manner. From the perspective of applications requiring storage services, the array presents a single, highly available copy of the data, though the data is replicated in the array. In addition, techniques are provided for accommodating failures and other behaviors, such as disk delays of several seconds, as well as different performance characteristics of devices, in a manner that is transparent to applications requiring storage services.

Figure 1:
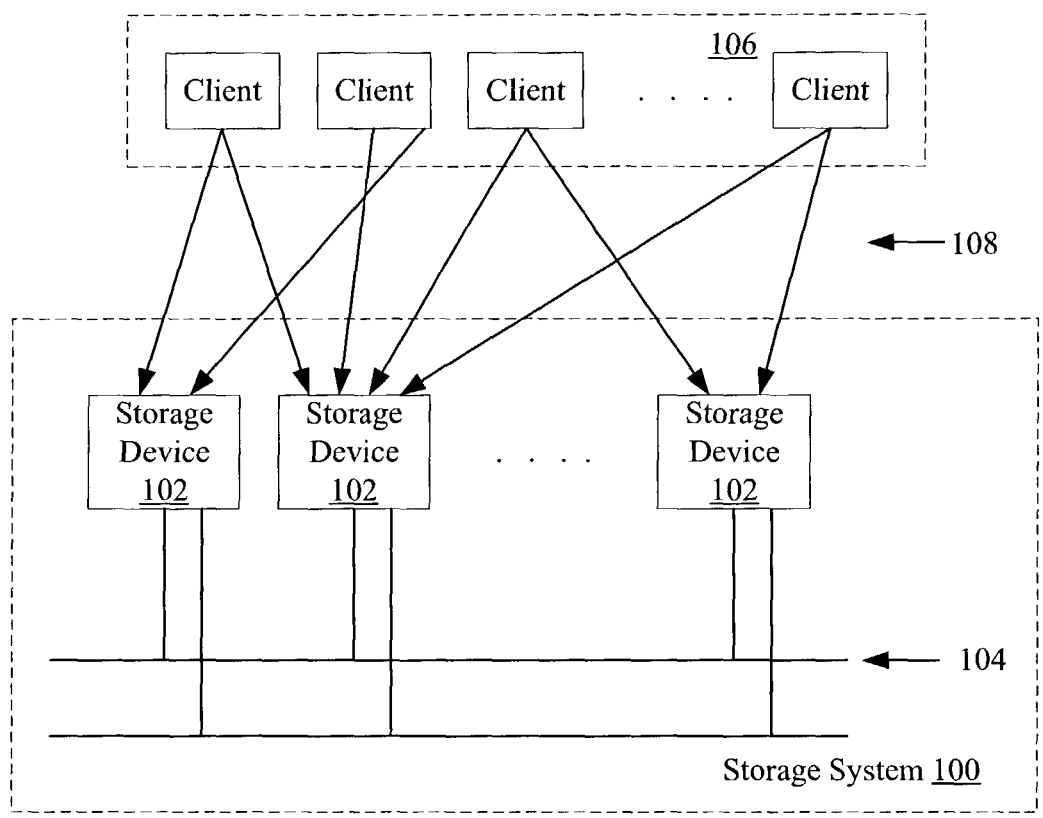
FIG. 1 illustrates an exemplary storage system including multiple redundant storage device nodes in accordance with an embodiment of the present invention.

FIG. 1 illustrates an exemplary storage system 100 including multiple redundant storage devices 102 in accordance with an embodiment of the present invention. The storage devices 102 communicate with each other via a communication medium 104, such as a network (e.g., using Remote Direct Memory Access or RDMA over Ethernet). One or more clients 106 (e.g., servers) access the storage system 100 via a communication medium 108 for accessing data stored therein by performing read and write operations. The communication medium 108 may be implemented by direct or network connections using, for example, iSCSI over Ethernet, Fibre Channel, SCSI or Serial Attached SCSI protocols. While the communication media 104 and 108 are illustrated as being separate, they may be combined or connected to each other. The clients 106 may execute application software (e.g., an email or database application) that generates data and/or requires access to the data.

Figure 2:
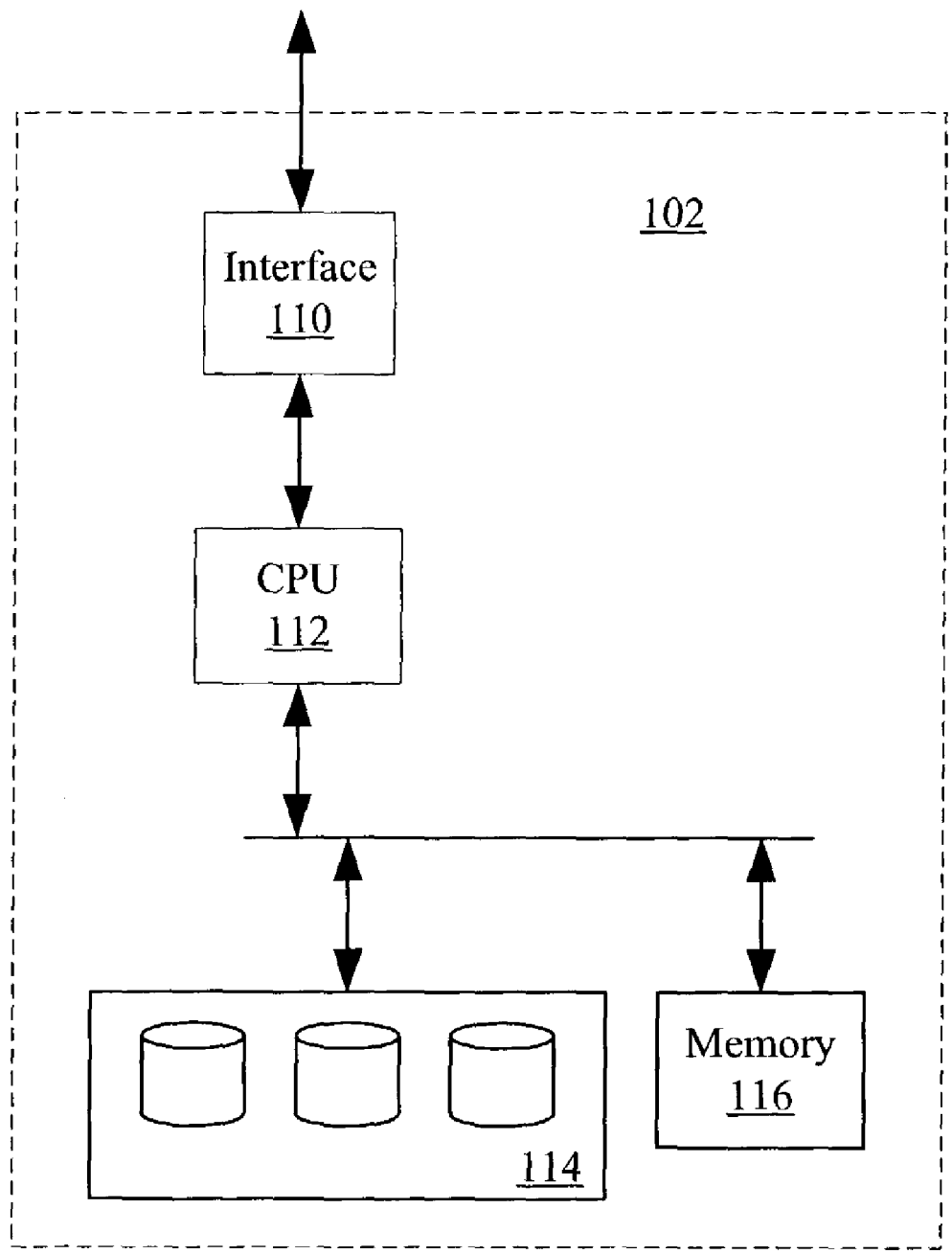
FIG. 2 illustrates an exemplary storage device for use in the storage system of FIG. 1 in accordance with an embodiment of the present invention.

FIG. 2 illustrates an exemplary storage device 102 for use in the storage system 100 of FIG. 1 in accordance with an embodiment of the present invention. As shown in FIG. 2, the storage device 102 may include an interface 110, a central processing unit (CPU) 112, mass storage 114, such as one or more hard disks, and memory 116, which is preferably non-volatile (e.g., NV-RAM). The interface 110 enables the storage device 102 to communicate with other devices 102 of the storage system 100 and with devices external to the storage system 100, such as the servers 106. The CPU 112 generally controls operation of the storage device 102. The memory 116 generally acts as a cache memory for temporarily storing data to be written to the mass storage 114 and data read from the mass storage 114. The memory 116 may also store timestamps associated with the data, as explained more detail herein.

Preferably, each storage device 102 is composed of off-the-shelf or commodity parts so as to minimize cost. However, it is not necessary that each storage device 102 is identical to the others. For example, they may be composed of disparate parts and may differ in performance and/or storage capacity.

To provide fault tolerance, data is replicated within the storage system 100. In a preferred embodiment, for each data element, such as a block or file, at least two different storage devices 102 in the system 100 are designated for storing replicas of the data, where the number of designated stored devices and, thus, the number of replicas, is given as "M." For a write operation, a value (e.g., for a data block) is stored at a majority of the designated devices 102 (e.g., in at least two devices 102 where M is two or three). For a read operation, the value stored in majority of the designated devices is returned.

For coordinating actions among the designated storage devices 102, timestamps are employed. In one aspect, a timestamp is associated with each data block at each storage device that indicates the time at which the data block was last updated (i.e. written to). In addition, a log of pending updates to each of the blocks is maintained which includes a timestamp associated with each pending write operation. An update is pending where a write operation has been initiated, but not yet completed. Thus, for each block of data at each storage device, two timestamps may be maintained.

For generating the timestamps, each storage device 102 includes a clock. This clock may either be a logic clock that reflects the inherent partial order of events in the system 100 or it may be a real-time clock that reflects "wall-clock" time at each device. If using real-time clocks, these clocks are synchronized across the storage devices 102 so as to have approximately the same time, though they need not be precisely synchronized. Synchronization of the clocks may be performed by the storage devices 102 exchanging messages with each other or by a centralized application (e.g., at one or more of the servers 106) sending messages to the devices 102. For example, each timestamp may include an eight-byte value that indicates the current time and a four-byte identifier that is unique to each device 102 so as to avoid identical timestamps from being generated.

Figure 10:
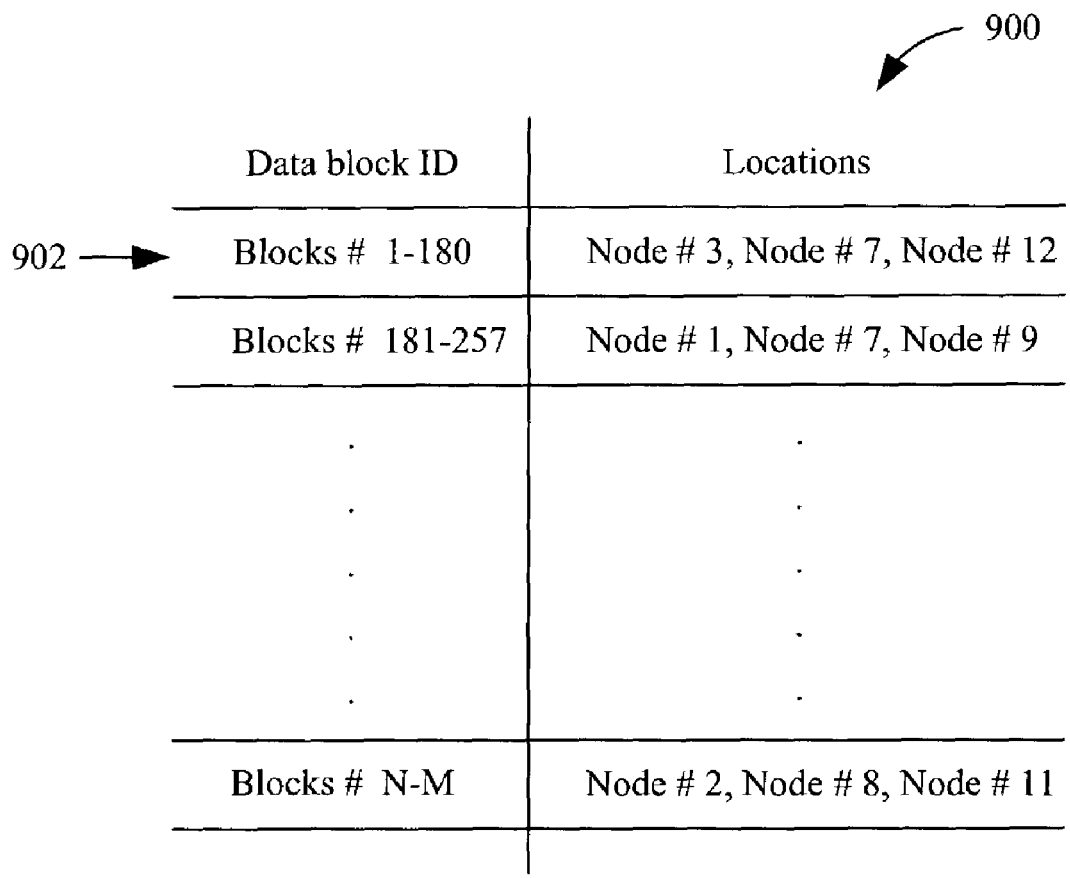
FIG. 10 illustrates a table for tracking assignments of data to storage device nodes in accordance with an embodiment of the present invention.

In one aspect, the present invention provides a technique for performing coordinated read operations. A read request may be received by any one of the storage devices 102 of the storage system 100, such as from any of the clients 106. If the storage device 102 that receives the request is not a designated device for storing the requested block of data, that device preferably acts as the coordinator for the request, as explained herein. While the device that receives the request may also be a designated device for storing the data, this is not necessary. Thus, any of the devices 102 may receive the request. So that each device 102 has information regarding the locations of data within the system 100, each may store, or otherwise have access to, a data locations table (FIG. 10). The coordinator device then polls the designated devices (and also accesses its own storage if it is also a designated device) and returns the data value currently stored at a majority of the designated devices.

Figure 3:
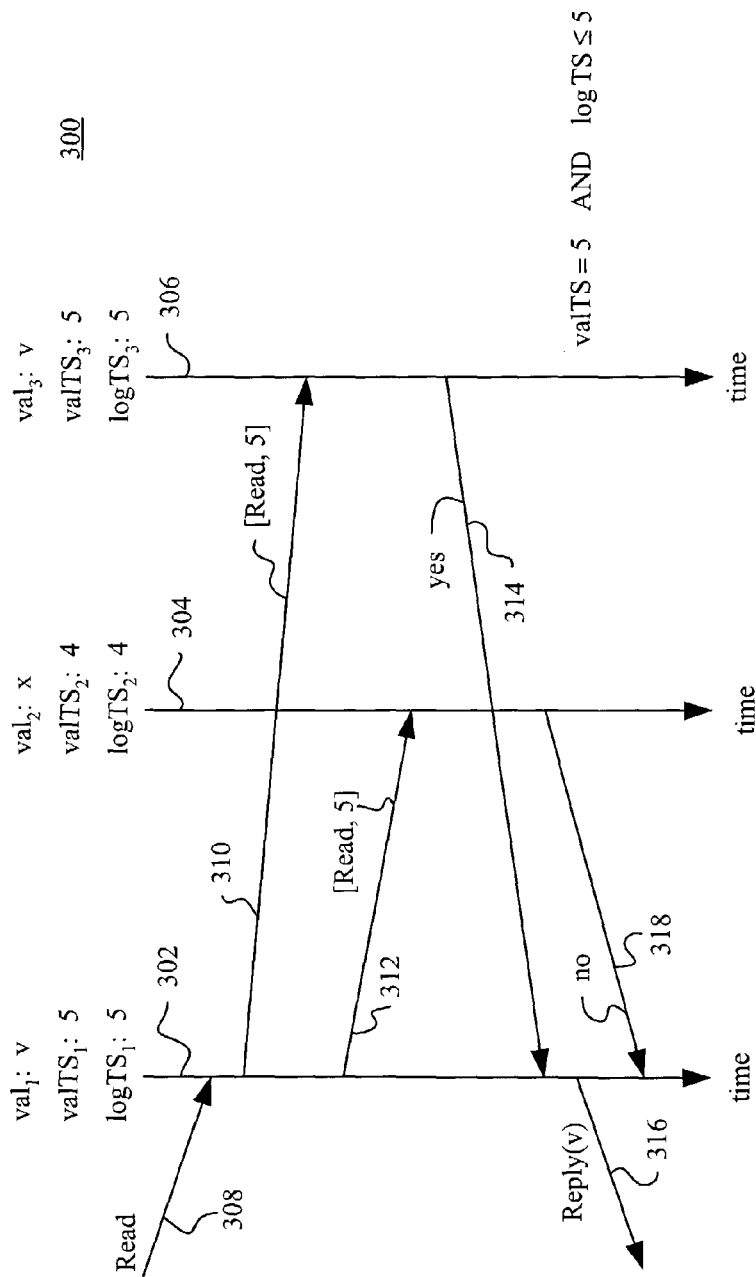
FIG. 3 illustrates an exemplary timing diagram for performing a read operation in accordance with an embodiment of the present invention.

FIG. 3 illustrates an exemplary timing diagram 300 for performing a read operation in accordance with an embodiment of the present invention. Operation of the storage system 100 of FIG. 1, including a plurality of the storage devices 102, may be controlled in accordance with the timing diagram of FIG. 3.

Each of the three vertical lines 302, 304 and 306 in FIG. 3 represents each of three storage devices 102 in FIG. 1 that are designated for storing the requested data. Messages communicated among the storage devices 102 are represented by arrows, in which the tail of an arrow indicates a device 102 that sent the message and the head of the arrow indicates a device that is to receive the message. Time is shown increasing from top to bottom in the diagram 300. Because three lines 302, 304 and 306 are shown, M equals three in this example. It will be apparent that M may be greater or less than three in other examples.

The leftmost vertical line 302 represents the storage device 102 that is acting as coordinator for the read operation, whereas the other lines 304 and 306 represent the other designated devices. The read request is illustrated in FIG. 3 by message 308.

Each of the three storage devices 102 stores a value for the requested data block, given as "val" in FIG. 3 and, for each data value, each of the three storage devices stores two timestamps, given as "valTS" and "logTS." The timestamp valTS indicates the time at which the data value was last updated. If a write operation to the data was initiated but not completed, the timestamp logTS indicates the time at which the uncompleted write operation was initiated. Otherwise, if there are no such pending write operations, the timestamp valTS is greater than or equal to the timestamp logTS. In the example of FIG. 3, prior to executing the read operation, the first of the three storage devices has as its value for the requested data, $val_1$="v" and its timestamps $valTS_1$ and $logTS_1$ are the same and, are equal to "5". In addition, the second of the three storage devices 102 has as its value for the requested data, $val_2$="x" and its timestamps $valTS_2$ and $logTS_2$ are the same and, are equal to "4" (because "4" is lower than "5", this indicates $valTS_2$ is earlier in time than $valTS_1$). For the third one of the storage devices, its value for the requested data is $val_3$="v" and its timestamps $valTS_3$ and $logTS_3$ are the same and, are equal to "5".

In response to the read request message 308, the first of the three storage devices 102 checks its update timestamp $valTS_1$ for the requested data and forwards messages 310 and 312 to the other two storage devices 102. As shown in FIG. 3, the messages 310 and 312 are of type "Read" so as to indicate a read operation and preferably include the value of the $valTS_1$ timestamp at the coordinator storage device (the first one of the three storage devices). Accordingly, the $valTS_1$ timestamp value of "5" is included in the messages 310 and 312.

In response to the messages 310 and 312, each of the other designated storage devices compares the value of its local timestamps valTS and logTS timestamp to the valTS timestamp value received from the coordinator storage device. If the local valTS timestamp is equal to the valTS timestamp received from the coordinator device, this indicates that both devices have the same version of the data block. Otherwise, not all of the versions may have been updated during a previous write operation, in which case, the versions may be different. Thus, by comparing the timestamps rather than the data itself, the devices 102 can determine whether the data is the same. It will be apparent that the data itself (or a representation thereof, such as a hash value) may be compared rather than the timestamps.

Also, if the local logTS is less than or equal to the valTS timestamp of the coordinator, this indicates that there is not a more recent update to the data that is currently pending. If the local logTS is greater than valTS, this indicates that the coordinator may not have the most recent version of the data available.

If the above two conditions are satisfied, the storage device returns an affirmative response ("yes" or "true") to the coordinator device. The above may be represented by the following expression:

If, (1)
$valTS_{(local)} = valTS_{(coordinator)}$, and
$logTS_{(local)} \leq valTS_{(coordinator)}$,
then, respond "yes;"
otherwise, respond "no."

Referring to the example of FIG. 3, when the third storage device (represented by the vertical line 306) evaluates expression (1) above, it returns a "yes" to the coordinator. This is shown in FIG. 3 by the message 314 sent from the third device to the coordinator.

Because the coordinator storage device and the third storage device have the same valTS timestamp (and there is not a pending update), this indicates that the coordinator and the third storage device have the same version of the requested data. Thus, in the example, a majority (i.e. two) of the designated devices (of which there are three) have the same data. Thus, in response to receiving the message 314, the coordinator sends a reply message 316 that includes the requested data stored at the coordinator. The reply message 316 is routed to the requesting server 106.

The requested data may come from one of the designated devices that is not the coordinator (e.g., the coordinator may not have a local copy of the data or the coordinator may have a local copy, but obtains the data from another device anyway). In this case, the coordinator appoints one of the designated devices as the one to return data. The choice of device may be random, or may be based on load information. For example, load can be shifted away from a heavily loaded device to its neighbors, which can further shift the load to their neighbors and so forth, such that the entire load on the system 100 is balanced. Thus, storage devices with heterogeneous performance accommodated for load balancing and load balancing can be performed despite some storage devices experiencing faults.

The coordinator then asks for <data,valTS,status> from the designated device and <valTS,status> from the others by sending different messages to each (e.g., in place of messages 310 and 312). The devices then return their valTS timestamps to the coordinator so that the coordinator can check the timestamps. The status information (a "yes" or "no" response) indicates whether logTS is less than or equal to valTS at the devices. If the designated device is not part of the quorum (e.g., because it is down or because it does not respond in time) or a quorum is not detected, the coordinator may initiate a repair operation (also referred to as a "recovery" operation) as explained herein (i.e., the coordinator considers the read to have failed). If the designated device does respond, and a quorum of affirmative responses are received, the coordinator declares success and returns the data from the designated device.

Thus, the coordinator may determine whether a majority of the designated storage devices 102 have the same version of the data by examining only the associated timestamps, rather than having to compare the data itself. In addition, once the coordinator determines from the timestamps that at least a majority of the devices have the same version of the data, the coordinator may reply with the data without having to wait for a "yes" or "no" answer from all of the designated storage devices.

Returning to the example of FIG. 3, when the second storage device (represented by the vertical line 304) evaluates the expression (1) above, it returns a negative response ("no" or "false") to the coordinator, as shown by a message 318 in FIG. 3. This is because the values for the valTS and logTS timestamps at the second device are lower than the valTS timestamp at the coordinator. This may have resulted from a communication failure that resulted in the second device not receiving the update that occurred at the time "5." However, as mentioned above, the coordinator may have already provided the requested data. In any event, because a majority responded with "yes," the "no" message 318 can be ignored by the coordinator.

As described above, the read operation allows the data (as opposed to the timestamps) to be read from any of the designated devices.

In another aspect, the present invention provides a technique for performing coordinated write operations. In general, write operations are performed in two phases including a "prewrite" phase and a write phase. In the prewrite phase, the logTS timestamp for the data to be written is updated and, then, in the write phase, the data and the valTS timestamp are updated. A partial or incomplete write operation is one in which not all of the storage devices designated to store a data block receive an update to the block. This may occur for example, where a fault occurs that affects one of the devices or when a fault occurs before all of the devices have received the update. By maintaining the two timestamps, partial or incomplete writes can be detected and addressed.

A write request may be received by any one of the storage devices 102 of the storage system 102 such as from any of the servers 106. The storage device 102 that receives the request preferable acts as the coordinator, even if it is not a designated device for storing the requested block of data. In an alternate embodiment, that device may forward the request to one of the devices 102 that is so designated which then acts a coordinator for the write request. Similarly to the read operation, any of the designated devices may receive the write request, however, the device that receives the request then acts as coordinator for the request.

Figure 4:
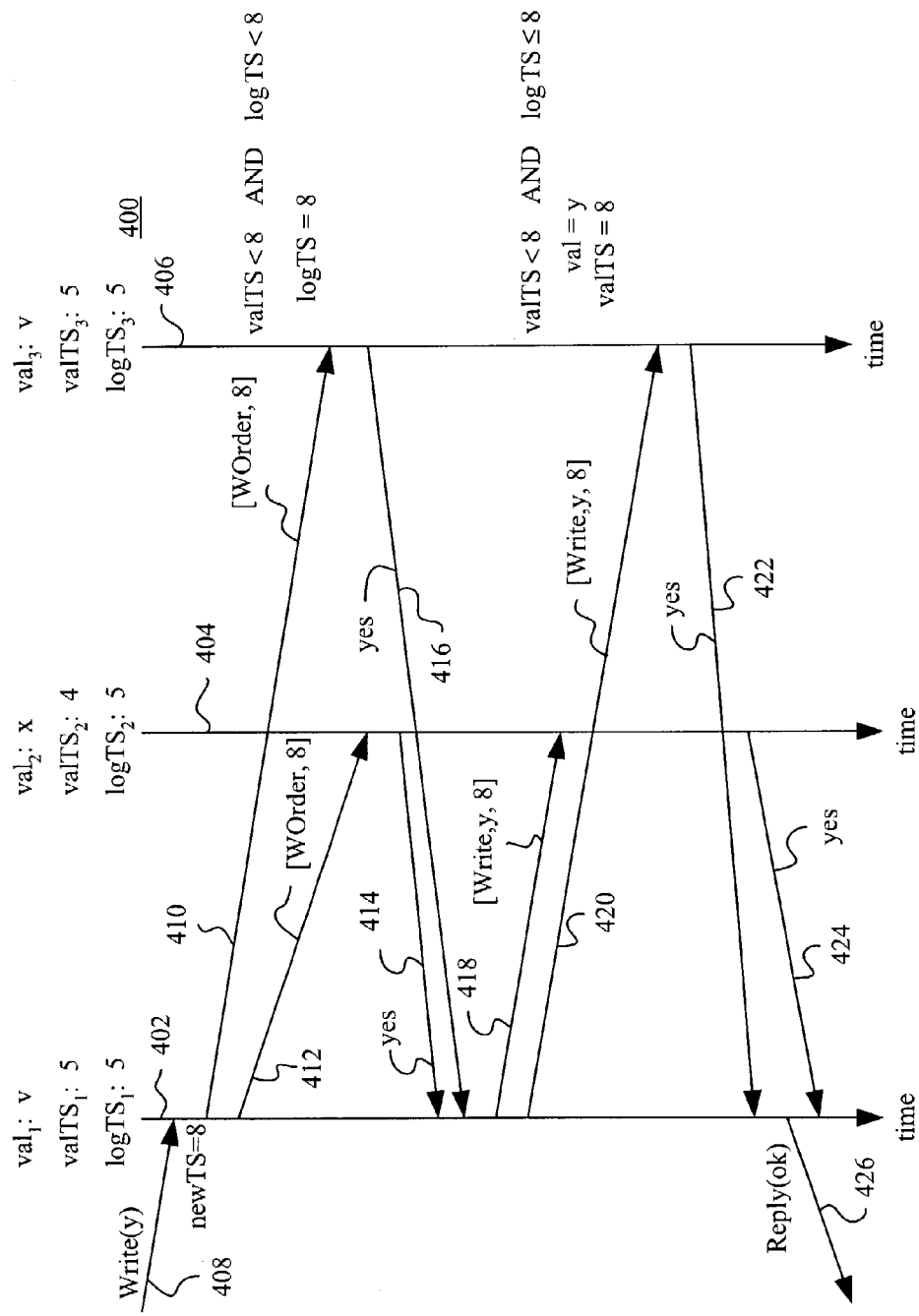
FIG. 4 illustrates an exemplary timing diagram for performing a write operation in accordance with an embodiment of the present invention.

FIG. 4 illustrates an exemplary timing diagram 400 for performing a write operation in accordance with an embodiment of the present invention. Operation of the storage system 100 of FIG. 1, including a plurality of the storage devices 102, may be controlled in accordance with the timing diagram of FIG. 4.

Each of the three vertical lines 402, 404 and 406 in FIG. 4 represents each of three storage devices 102 in FIG. 1, in which the leftmost vertical line 402 represents the storage device that is acting as coordinator for the write operation and the other lines 404 and 406 represent the other designated devices. The write request is illustrated in FIG. 4 by message 408 received by the coordinator.

In the example of FIG. 4, prior to executing the write operation, the first of the three storage devices 102 has as its current value for the data at the location to be written, $val_1$="v" and its timestamps $valTS_1$ and $logTS_1$ are the same and, are equal to "5". In addition, the second of the three storage devices 102 has as its value for the data at the location to be written, $val_2$="x", its timestamp $valTS_2$ is equal to "4" and its timestamp $logTS_2$ is equal to "5". For the third one of the storage devices, its value for the data is $val_3$="v" and its timestamps $valTS_3$ and $logTS_3$ are the same and equal to "5".

In response to the write request message 408, the coordinator forwards a new timestamp value, newTS, of "8" as a new value for the logTS timestamps to the other two storage devices via messages 410 and 412. This new timestamp value is preferably representative of the current time at which the write request is initiated. As shown in FIG. 4, these write initiation messages 410 and 412 are of type "WOrder" indicating a prewrite operation and include the new timestamp value of "8."

Then, in response to the messages 410 and 412, each of the other designated storage devices compares the current value of its local logTS timestamp and the value of its local valTS timestamp to the newTS timestamp value received from the coordinator storage device. If both the local logTS timestamp and the local valTS timestamp are lower than the newTS timestamp received from the coordinator device, this indicates that there is not currently another pending or completed write operation that has a later logTS timestamp.

In this case, the storage device updates its local logTS timestamp to the new value and returns an affirmative or "yes" response message to the coordinator.

Otherwise, if there is a more recent write operation in progress, the storage device responds with a negative or "no" response. If a majority of the designated devices have a higher value for either of their timestamps, this indicates that the current write operation should be aborted in favor of the later one since the data for the later write operation is likely more up-to-date. In this case, the coordinator receives a majority of "no" responses and the current write operation is aborted. The coordinator may then retry the operation using a new (later) timestamp.

The above may be represented by the following expression:

$$\text{If,} \quad (2)$$
$$valTS_{(local)} < newTS, \text{ and}$$
$$logTS_{(local)} < newTS,$$
$$\text{then, respond "yes" and set } logTS_{(local)} = newTS;$$
$$\text{otherwise, respond "no."}$$

Referring to the example of FIG. 4, $valTS_2$ is "4" and $logTS_2$ is "5." Because both values are less than the newTS value of "8," the second storage device (represented by the vertical line 404 returns a "yes" in message 414 and sets its $logTS_2$ timestamp equal to the newTS value of "8." Similarly, $valTS_3$ and $logTS_3$ are both equal to "5," which is less than "8." Accordingly, the third storage device (represented by vertical line 406) also returns a "yes" in message 416 and sets its $logTS_3$ timestamp equal to the newTS value of "8." In the meantime, the coordinator device also compares its timestamps $valTS_1$ and $logTS_1$ to the timestamp newTS. Because the two values are both "5," which is less than "8," the coordinator device also has a "yes" answer (though it need not be forwarded) and sets its $logTS_1$ timestamp equal to "8."

At this point, the prewrite phase is complete and all three of the designated storage devices are initialized to perform the second phase of the write operation, though this second phase can proceed with a majority of the devices. Thus, in the example, the second phase could proceed even if one of the designated devices had returned a "no" response.

To perform the second phase, the coordinator device sends a message type "Write" indicating the second phase of the write operation that includes the new version of the data and the timestamp newTS to each of the other designated devices. These messages are shown in FIG. 4 by messages 418 and 420, respectively. Each of the messages 418 and 420 includes the message type, "Write," the new version of the data, "y," and the new timestamp, "8."

Then, in response to the messages 418 and 420, each of the other designated storage devices preferably compares the current value of its local logTS timestamp and the value of its local valTS timestamp to the newTS timestamp value received in the "Write" message from the coordinator storage device. This comparison ensures that there is not currently another pending or completed write operation that has a later logTS timestamp, as may occur if another write operation was initiated before the completion of the current operation.

More particularly, if the local valTS timestamp is lower than the newTS timestamp received from the coordinator device and the local logTS timestamp is less than or equal to the newTS timestamp, this indicates that there is not currently another pending or completed write operation that has a later timestamp. In this case, the storage device updates the data to the new value. In addition, the storage device preferably updates its local valTS timestamp to the value of the newTS timestamp and returns an affirmative or "yes" response message to the coordinator.

Otherwise, if there is a more recent write operation in progress, the storage device responds with a "no" response. If the coordinator receives a majority of "no" responses, the current write operation is aborted.

The above may be represented by the following expression:

If, (3)
$valTS_{(local)} < newTS$, and
$logTS_{(local)} \leq newTS$,
then, respond "yes" and set $valTS_{(local)} = newTS$ and $val_{(local)} = val_{(coordinator)}$;
otherwise, respond "no."

Referring to the example of FIG. 4, the third storage device (represented by the vertical line 404) returns a "yes" response via message 422 and the second storage device (represented by vertical line 406) also returns a "yes" via message 424. In the meantime, the coordinator device also compares its timestamps $valTS_1$ and $logTS_1$ to the timestamp newTS. The coordinator device also has a "yes" answer (though it need not be forwarded) and sets its $valTS_1$ timestamp equal to "8" and its version of the data $val_1$ to "v."

In addition, once the coordinator has determined that a majority of the storage devices have returned a "yes" answer for the second phase of the write operation, the coordinator sends a reply message to the requestor. As shown in FIG. 4, the message 426 may be sent as soon as the coordinator receives the reply message 422 from the third device since, the coordinator and the third device and, thus, a majority, would have confirmed the second phase. In this case, the reply message 424 from the second device may be ignored because even if the message 424 included a "no" answer, the majority had returned "yes" answers, indicating that the operation was successful.

In another aspect, the invention provides a technique for performing repair operations. Assume that a write operation is unsuccessful because the coordinator for the write operation device experienced a fault after sending a prewrite message, but before completing the write operation. In this case, the storage devices designated for storing the data (e.g., a block) for which the unsuccessful write operation had been attempted will have a logTS timestamp that is higher than the valTS timestamp of the coordinator. In another example, a communication error may have prevented a storage device from receiving the prewrite and write messages for a write operation. In this case, that storage device will have different valTS timestamp for this block of data from that of the other storage devices designated to store that block of data. In either case, when a read operation is requested for the data, the coordinator device for the read operation will detect these faults when the devices return a "no" reply in response to the read messages sent by the coordinator. In this case, the coordinator that detects this fault may initiate a repair operation to return the data block to consistency among the devices designated to store the block. Because repair operations are preformed only when an attempt is made to read the data, this aspect of the present inventions avoids unnecessary operations, such as to repair data that is not thereafter needed.

In sum, the repair operation is performed in two phases. In an initialization phase, a coordinator for the repair operation determines which of the designated devices has the newest version of the data block. In a second phase, the coordinator writes the newest version of the data to the devices. The timestamps for the block at the designated devices are updated as well.

Figure 5:
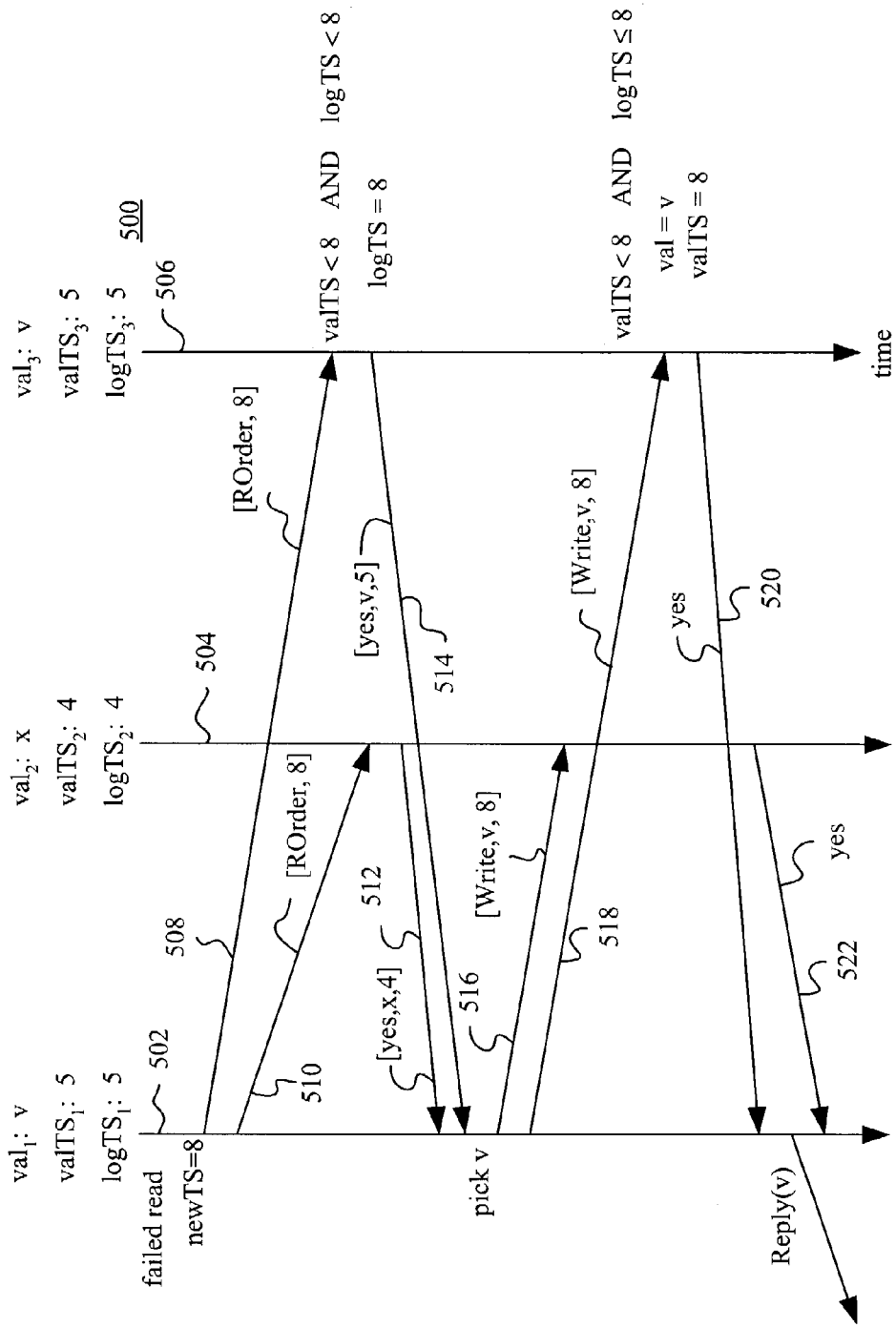
FIG. 5 illustrates an exemplary timing diagram for performing a data recovery operation in accordance with an embodiment of the present invention.

FIG. 5 illustrates an exemplary timing diagram 500 for performing a repair operation in accordance with an embodiment of the present invention. Operation of the storage system 100 of FIG. 1, including a plurality of the storage devices 102, may be controlled in accordance with the timing diagram of FIG. 5.

Each of the three vertical lines 502, 504 and 506 in FIG. 5 represents each of three storage devices 102 in FIG. 1, in which the leftmost vertical line 502 represents the storage device that is acting as coordinator for the repair operation and the other lines 504 and 506 represent the other designated devices.

In the example of FIG. 5, prior to executing the repair operation, the first of the three storage devices (i.e. the coordinator) has as its current value for the data at the location to be written, $val_1$="v" and its timestamps $valTS_1$ and $logTS_1$ are the same and, are equal to "5". In addition, the second of the three storage devices has as its value for the data at the location to be written, $val_2$="x" and its timestamps $valTS_2$ and $logTS_2$ are the same and equal to "4". For the third one of the storage devices, its value for the data is $val_3$="v" and its timestamps $valTS_3$ and $logTS_3$ are the same and equal to "5".

The repair operation may be initiated when the coordinator device detects a failed read operation. Referring to FIG. 3, if the message 314 got lost, for example, the coordinator would not receive a majority of affirmative responses. This is indicated in FIG. 5 by the "failed read" notation near the beginning of the timeline 502 for the coordinator device. The coordinator device initiates the repair operation by sending repair initiation messages 508 and 510 to the other designated devices. As shown in FIG. 5, these repair initiation messages 508 and 510 are of type "ROrder" indicating a repair operation and include a new timestamp value, newTS, of "8." This new timestamp value is preferably representative of the current time at which the repair operation is initiated.

In response to the repair initiation messages 508 and 510, each of the other designated storage devices compares the current value of its local logTS timestamp and the value of its local valTS timestamp to the new timestamp value newTS received from the coordinator storage device. If both the local logTS timestamp and the local valTS timestamp are lower than the newTS timestamp received from the coordinator device, this indicates that there is not currently a pending or completed write operation that has a later timestamp. In this case, the storage device updates its local logTS timestamp to the value of the newTS timestamp and returns an affirmative or "yes" response message to the coordinator. In addition, each storage device returns the current version of the data block to be corrected and its valTS timestamp.

Otherwise, if there is a more recent write operation in progress, the storage device responds with a negative or "no" response. If a majority of the designated devices have a higher value for either of their timestamps, this indicates that the repair operation should be aborted in favor of the later-occurring write operation since the data for the later write operation is likely more up-to-date. In this case, the coordinator receives a majority of "no" responses and the current repair operation is aborted (though the original read operation may be retried).

The above may be represented by the following expression:

$$
\begin{aligned}
&\text{If,} \quad (4)\\
&\quad \text{valTS}_{(local)} < \text{newTS, and}\\
&\quad \text{logTS}_{(local)} < \text{newTS},\\
&\text{then, respond "yes" and set logTS}_{(local)} = \text{newTS};\\
&\text{otherwise, respond "no."}
\end{aligned}
$$

Thus, as shown in FIG. 5, the second designated storage device responds with message 512, which includes a "yes" response, the data contents, "x" and its valTS$_2$ timestamp of "4." In addition, the third designated storage device responds with message 514, which includes a "yes" response, the data contents, "v" and the valTS$_3$ timestamp of "5." In the meantime, the coordinator checks its own data and determines that it also has a "yes" answer (though it need not be forwarded), its version of the data val$_1$ is "v" and its valTS$_1$ timestamp is equal to "5." Because all of the devices returned a "yes" answer, each preferably sets its logTS timestamp to the newTS value, which in the example, is "8."

The coordinator then determines which storage device has the most-current version of the data. This is preferably accomplished by the coordinator comparing the valTS timestamps received from the other devices, as well as its own, to determine which valTS timestamp is the most recent. The coordinator then initiates a write operation in which the most recent version of the data replaces any inconsistent versions. In the example, the most recent valTS timestamp is "5," which is the valTS timestamp of the coordinator and the third storage device. The second device has an older timestamp of "4" and different version of the data, "x." The version of the data associated with the valTS timestamp of "5" is "v." Accordingly, the version "v" is preferably selected by the coordinator to replace the version "x" at the second storage device.

The write operation is accomplished by the coordinator device sending a message type "Write" that includes the new version of the data and the timestamp newTS to each of the other designated devices. These messages are shown in FIG. 5 by messages 516 and 518, respectively. Each of the messages 516 and 518 includes the message type, "Write," the new version of the data, "v," and the new timestamp, "8." Note that the messages 516 and 518 may be identical in format to the messages 420 and 422 (FIG. 4) which were sent to perform the second phase of the write operation.

Then, similarly to the second phase of the write operation of FIG. 4, in response to the messages 516 and 518, each of the other designated storage devices preferably compares the current value of its local logTS timestamp and the value of its local valTS timestamp to the newTS timestamp value received in the "Write" message from the coordinator storage device. This comparison ensures that there is not currently another pending or completed write operation that has a later timestamp, as may occur in the case where a write operation was initiated before completion of the current repair operation. Otherwise, if there is a more recent write operation in progress, the storage device responds with a "no" response. This evaluation for the second phase of the repair operation may be expressed by expression (3), above.

In addition, the devices update their local logTS timestamps logTS$_2$ and logTS$_3$ to the newTS value of "8."

Referring to the example of FIG. 5, the third storage device (represented by the vertical line 504) returns a "yes" response via message 520 and the second storage device (represented by vertical line 506) also returns a "yes" via message 522. Accordingly, these devices set valTS$_2$ and valTS$_3$ timestamps to the newTS value of "8" and update their version of the data val$_2$ and val$_3$ to "v." In the meantime, the coordinator device also compares its timestamps valTS$_1$ and logTS$_1$ to the timestamp newTS. The coordinator device also has a "yes" answer (though it need not be forwarded) and sets its valTS$_1$ timestamp equal to "8" and its version of the data val$_1$ to "v."

Once the coordinator has determined that a majority of the storage devices have returned a "yes" answer for the second phase of the repair operation, the coordinator may send a reply message 524 to the requestor that includes the data value "v." This reply is preferably sent where the repair operation was initiated in response to a failed read operation. The reply 524 thus returns the data requested by the read operation. As shown in FIG. 5, the message 524 may be sent as soon as the coordinator receives the message 520 from the third device since the coordinator and the third device, and thus a majority, would have confirmed the second phase of the repair operation. In this case, the message 522 from the second device may be ignored since even if the message 522 included a "no" answer, the majority had returned "yes" answers, indicating that the operation was successful.

Assume that two timestamps, valTS and logTS, are associated with each block of data and that each of these timestamps is 12 bytes long. As mentioned, each timestamp may include a value that indicates the current time and an identifier that is unique to each device 102 so as to avoid identical timestamps from being generated. Assume also that each data block is 1 KB (1 kilobyte) and that the storage system 100 of FIG. 1 has a capacity of 1 TB (1 terabyte). These numbers imply that up to 12 GB (12 gigabytes) of capacity may be required for storing the timestamps. Because the timestamps are preferably maintained in fast, persistent storage, non-volatile memory (NV-RAM) would be desired. However, providing a sufficient capacity of NV-RAM would be costly.

Thus, in accordance with an aspect of the invention, techniques are provided for managing the timestamps so as to reduce the required storage capacity for them. More particularly, for the read, write and repair operations described above, it can be noted that the timestamps are used to disambiguate concurrent updates to the data (as in the case of logTS) and to detect and repair results of failures (as in the case of valTS). Thus, in one aspect, where all of the replicas of a data block are functional, timestamps may be discarded after each device 102 holding a replica of the data has acknowledged an update. Thus, for write and repair operations, a third phase may be performed in which the coordinator instructs the designated devices to discard the timestamps for a data block after all of the designated devices have replied. Alternately, each device 102 determine whether its valTS timestamp is equal to its logTS timestamp and if so it can delete one of them (e.g., the logTS timestamp).

Thus, each storage device 102 need only maintain timestamps for data blocks that are actively being updated. If a failure affects one or more of the replicas, the other devices 102 maintain their timestamps for the data until the data is repaired or failure is otherwise taken care of (e.g., the system 100 is reconfigured).

In another aspect, because a single write request typically updates multiple data blocks, each of these data blocks will have the same timestamp. Accordingly, timestamps may be maintained for ranges of data blocks, rather than for each data block. For example, if eight contiguous data blocks "$Block_1$" through "$Block_8$" are updated by the same write request, a single timestamp entry may be maintained for all eight blocks rather than maintaining eight timestamp entries, one for each for block. The timestamps may be maintained as entries in a data structure. Each entry may have the following form:

[start, end, timestamp(s)]     (5)

Where start identifies the beginning of the range, end identifies the end of the range and timestamp(s) applies to all of blocks of the range. In the example, a single entry for two timestamps may take the form:

[$Block_1$, $Block_9$, $valTS_{1-9}$, $logTS_{1-9}$].     (6)

In this case, a single data structure may be maintained for both the valTS timestamp and the logTS timestamp. Alternately, two entries may be maintained, one for each of the two timestamps. In this case, two data structures may be maintained, one for each of two timestamps. In the example, the two entries may take the form:

[$Block_1$, $Block_9$, $valTS_{1-9}$]     (7)

and

[$Block_1$, $Block_9$, $logTS_{1-9}$].     (8)

Note that the end of the range in the exemplary entries above is identified by the next block after the eight blocks that are within the range. Thus, entry (6) above includes "$Block_9$" which signifies the ninth block, whereas, only eight blocks are within the range for the associated timestamps. An alternate convention may be employed, such as where the end included in the entry is the last block within the range. For example, entry (6) above would instead take the form:

[$Block_1$, $Block_8$, $valTS_{1-8}$, $logTS_{1-8}$].     (9)

where "$Block_8$" signifies the eighth block which is the last block in the range.

Figure 6:
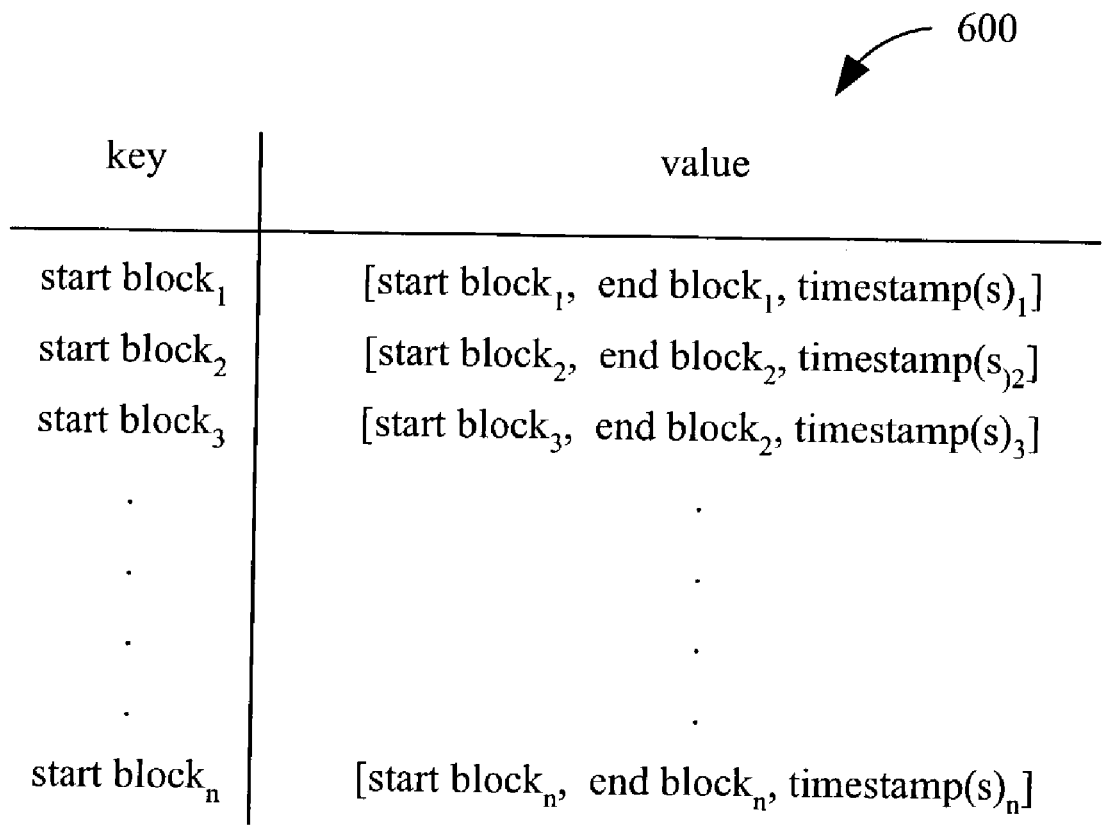
FIG. 6 illustrates an exemplary portion of a data structure in which timestamps are stored in accordance with an embodiment of the present invention.

In a preferred embodiment, the timestamp entries above are maintained in an interval tree-like data structure, particularly, a B-Tree data structure. FIG. 6 illustrates a B-Tree data structure 600 for maintaining timestamps in accordance with an aspect of the present invention. As shown in FIG. 6, the data structure 600 includes a plurality of key-value pairs, where the keys are arranged in ascending order and each is associated with a value or entry, corresponding to the timestamp entry of the form [start, end, timestamp(s)] above. Each entry preferably covers a range of data blocks that does not overlap the range of any other entry. Thus, in FIG. 6, the range identified by $start_1$ and $end_1$ does not overlap the range identified by $start_2$ and $end_2$. Further, the entries are preferably arranged in ascending order of the value for start where the start values also serve as the keys.

A data structure 600 is preferably maintained by each storage device 102 for maintaining timestamps for data blocks stored by the storage device 102. The data structure 600 is preferably stored in NV-RAM 116 (FIG. 2).

The following operations may be used for manipulating the data structure 600:

find-largest (base): given a value for base, an entry is returned having the largest key in the data structure such that key≦base. If no such entry is present in the data structure, the operation may return the entry having the smallest key larger than base. In accordance with the present invention, start may be used as the base for this operation to locate timestamp entries having an equal start or a next lowest start and, if no such entry is in the data structure, to locate a timestamp entry having a next highest start. Such entries may potentially overlap a new entry to be inserted into the data structure. If no entries are stored in the data structure, this operation preferably returns an end-of-list indicator.

find-next (base): given a value for base, an entry is returned where the key is the smallest key such that key> base. In accordance with the present invention, start may be used as the base for this operation to locate timestamp entries having a next highest start. If no such entry is present in the data structure, this operation preferably returns an end-of-list indicator.

insert (entry): an entry is inserted in the data structure at a location identified by a key. In accordance with the present invention, this operation may be used to insert an entry of the form [start, end, timestamp] into the data structure.

replace (entry): an entry identified by a key is replaced with entry. In accordance with the present invention, this operation may be used to replace an entry of the form [start, end, timestamp] with an entry having a different end and/or timestamp.

Figure 7A:
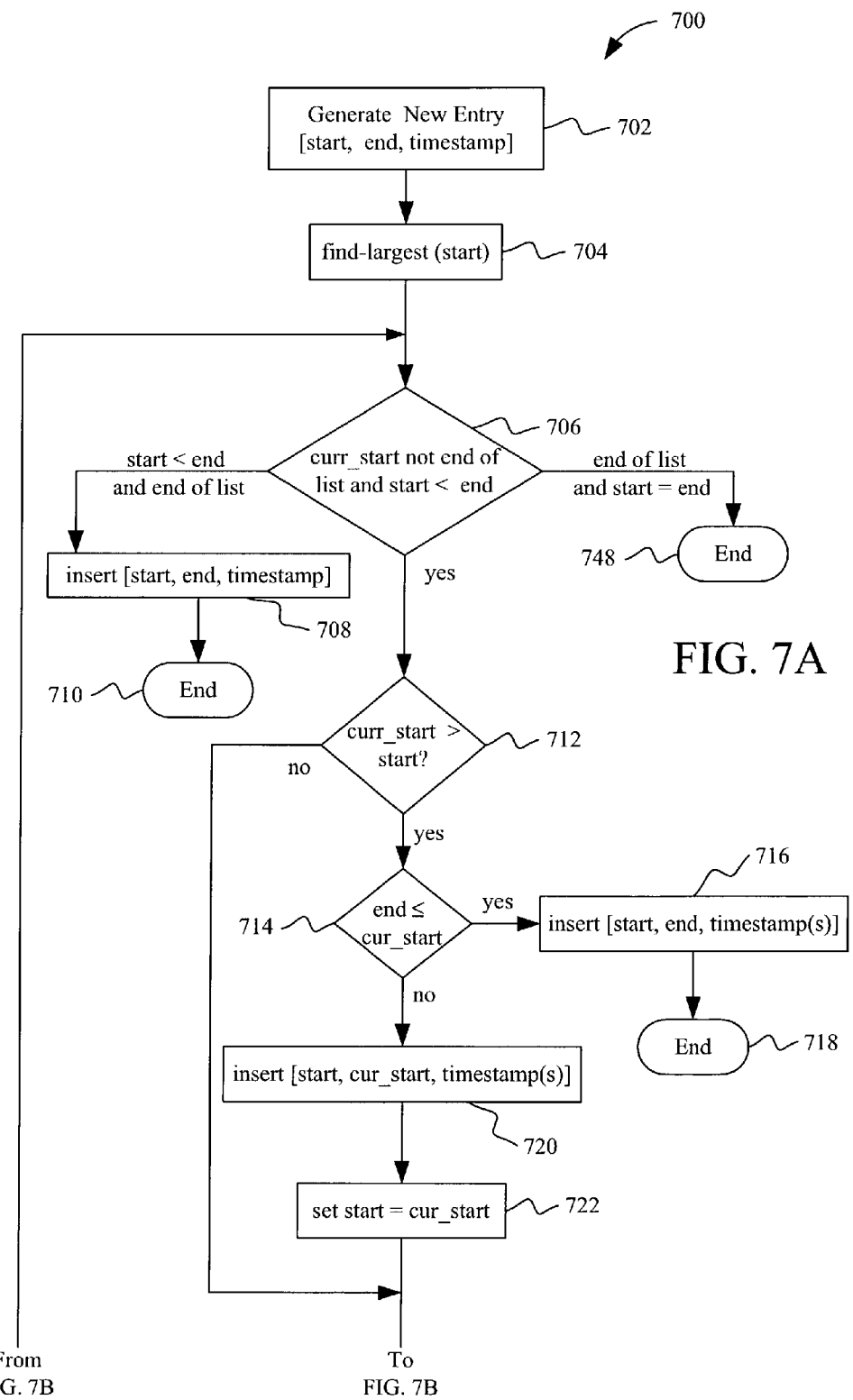
Figure 7C:
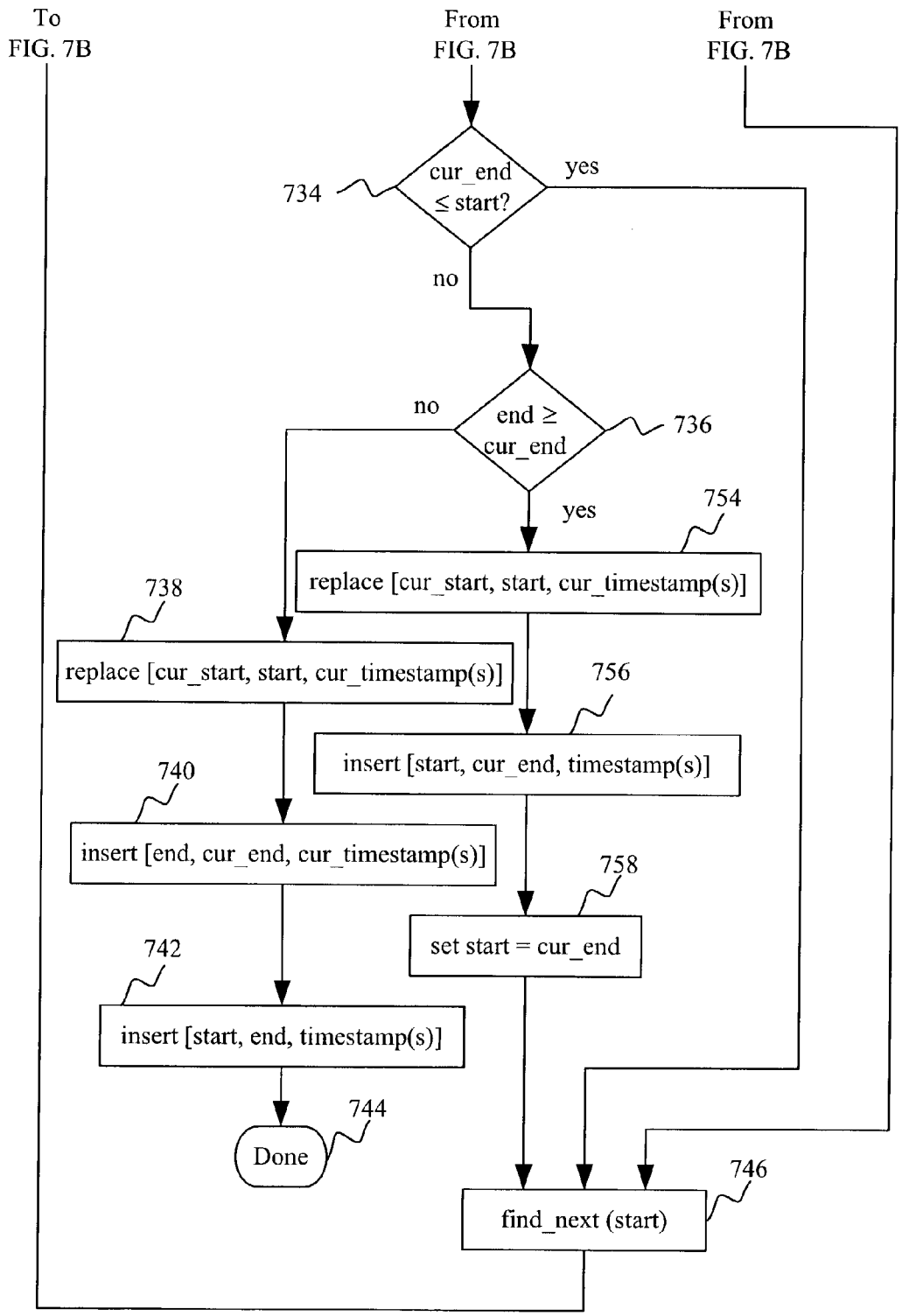

FIG. 7 illustrates a flow diagram of a method 700 for maintaining the data structure of FIG. 6 in accordance with an embodiment of the present invention. The method 700 is preferably implemented by hardware and/or software included in each storage device 102 (FIGS. 1–2) for maintaining its associated data structure. The method 700 provides for changing or adding entries in the data structure 600 so as to maintain the data structure 600 current with respect to the timestamps, while the timestamps are changed, such as in response to performing write and repair operations, as described herein.

When a write or repair operation is performed, the timestamps for a range of data blocks will generally need to be updated in the data structure 600 to maintain the data structure 600 current. The method 700 is preferably performed each time a timestamp is to be updated for a data block or a range of data blocks. For example, the initialization phase for a write operation, as described above in reference to FIG. 4, may require updating the logTS timestamps for a range of data blocks. Thus, an entry of the form: [start, end, timestamp(s)] is to be added to the data structure 600, where start identifies the start of the range of affected blocks, end identifies the end of the range and timestamp represents the new value of the logTS timestamp for the range of data blocks (the old value of the valTS timestamp for the blocks may also be included in the entry). Thus, referring to FIG. 7, a new entry of this form is generated in step 702, for example, during the first phase of the write operation. The range of blocks identified by the new entry may overlap portions of the ranges for entries already in the data structure 600. Accordingly, the method adds the new timestamps to the data structure 600 while ensuring that the entries on the data structure 600 do not have overlapping ranges.

In a step 704, a find-largest(base) operation may be performed using start from the new entry generated in step 702 as the base. As mentioned, the find-largest(base) operation locates an entry in the data structure having an equal start or a next lowest start and, if no such entry is in the data structure, the operation locates a timestamp entry having a next highest start. Where an entry is located in step 704, it is referred to herein as the "current entry" and may be given as: [cur_start, cur_end, timestamp(s)].

Figure 8A:
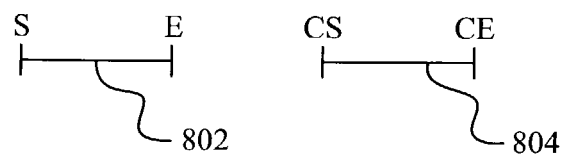
FIGS. 8A–H illustrates various possible relationships between a range for a timestamp entry to be added to a data structure and a range for an existing entry.

FIG. 8A illustrates a possible relationship between the range 802 for the entry to be added to the data structure 600 and the range 804 for the current entry identified in step 704. The diagram of FIG. 8 assumes that all of the data blocks are arranged in sequential order. The range 802 of data blocks for the entry to be added, [start, end, timestamp(s)], is shown in FIG. 8A as starting at position "S" and ending at position "E." The range 804 of data blocks for the current entry identified in step 704, [cur_start, cur_end, timestamps(s)], is shown in FIG. 8A as starting at position "CS" and ending at position "CE." FIG. 8A shows that the range 802 precedes the range 804 and there is no overlap between them. Other possible relationships between the range 802 and the range 804 are illustrated in FIGS. 8A–8H.

In step 706, a determination may be made as to whether the current entry is the last entry in the data structure 600. This determination may be accomplished, for example, by checking if the current start (i.e. "cur_start" or "CS") is associated with an end-of-list indicator for the data structure 600. If so, this indicates a stopping condition for the method has been reached. This stopping condition may occur during a first pass through the step 706 if the data structure 600 initially has no entries. In this case, the find-largest(base) operation will return the end-of-list indicator. Otherwise, this stopping condition may occur in a subsequent pass through the step 706, in which case, program flow may terminate in a step 748.

In addition, in step 706, a determination may be made as to whether start for the entry to be added to the data structure 600 is smaller than end for the entry to be added. This will generally be the case for a first pass through the step 706. However, in a subsequent pass through the step 706, insertions or replacement operations performed in accordance with other steps of the method 700 may have reduced the range 802 such that start is equal to end (i.e. all data blocks have been processed and added to the data structure)

If, in a first pass through the step 706, the data structure 600 initially has no entries, program flow moves to a step 708. In step 708 the new entry [start, end, timestamp(s)] is inserted into the tree. This may be accomplished using the insert(base) operation. Program flow may then terminate in step 710.

Figure 8B:
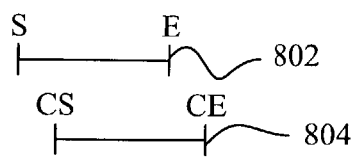
Figure 8C:
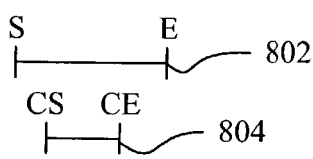
Figure 8D:
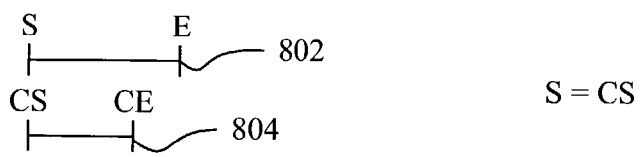
Figure 8E:
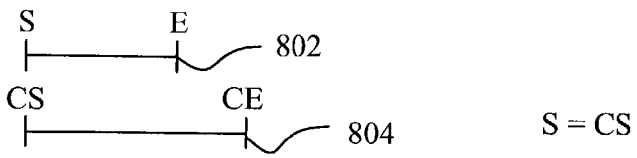
Figure 8F:
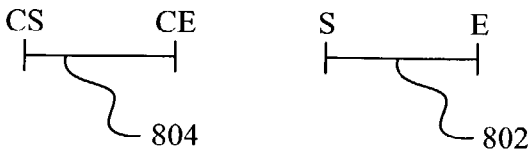

However, if in a first pass through the step 706, the data structure does have one or more entries, program flow moves to a step 712. In step 712, a determination is made as to whether cur_start is greater than start. FIGS. 8A, 8B and 8C illustrate relationships between the ranges 802 and 804 that satisfy this condition. If this condition is satisfied, program flow moves to a step 714, in which a determination is made as to whether end is less than or equal to cur_start. This condition is satisfied by FIG. 8A. Thus, the ranges 802 and 804 are as shown in FIG. 8A, there is no overlap between them, and the new entry may be inserted into the tree 600 using an insert operation in step 716 of the form: insert[start, end, timestamp(s)]. Program flow may then terminate in step 718.

If the condition of step 714 is not satisfied, then the relationship between the ranges 802 and 804 is as shown in FIG. 8B or 8C. In this case, there is an overlap between the ranges 802 and 804. Note that in FIGS. 8B and 8C, a range exists between "S" and "CS" for which the new timestamp is to be entered. Thus, in step 720 this range may be inserted into the data structure 600 using an insert operation of the form: insert[start, cur_start, timestamp(s)]. Then, because the range from "S" to "CS" has been entered into the data structure 600, start may be set equal to cur_start in step 722. Thus, after performing steps 720 and 722, the relationship shown in FIG. 8B is converted to that shown in FIG. 8E. Similarly, the relationship shown in FIG. 8C is converted to that shown in FIG. 8D.

Recall that in step 712, a determination was made as to whether cur_start was greater than start. If this condition is not satisfied, the relationship between the ranges 802 and 804 may be shown as in one of FIGS. 8D–8H. Thus, from step 712 or step 722, program flow moves to a step 724 in which a determination may be made as to whether cur_start is equal to start. This condition is satisfied in FIGS. 8D and 8E. In this case, program flow may move to state 726 in which a further determination may be made as to whether end is greater than or equal to cur_end. Where end is less than cur_end, this condition may be shown as in FIG. 8E. In this case, the timestamp for the range between "S" and "E" may be replaced in step 728 by using a replace operation of the form: replace[cur_start, end, timestamp(s)]. Alternately, the following form may be used: replace[start, end, timestamp(s)] since in this case, start is equal to cur_start. Then, in step 730, the range between "E" and "CE" may be inserted into the data structure 600 in step 732 using an insert operation of the form: insert[end, cur_end, cur_timestamp(s)]. Program flow may then terminate in a step 732.

Recall that in step 724, a determination was made as to whether cur_start is equal to start. If this condition is not satisfied, the relationship between the ranges 802 and 804 may be shown as in FIGS. 8F, 8G or 8H. A determination may then be made in step 734 as to whether cur_end is less than or equal to start. If this condition is not satisfied, the relationship between the ranges 802 and 804 may be shown as in FIG. 8G or 8H. A determination may then be made in step 736 as to whether end is greater than or equal to cur_end. If this condition is not satisfied, then the relation between the ranges 802 and 804 may be shown as in FIG. 8H. In this case, the timestamp for the range between "CS" and "S" may be updated in step 738 using a replace operation of the form: replace[cur_start, start, cur_timestamp(s)]. And, the timestamp for the range between "E" and "CE" may be updated in step 740 using a replace operation of the form: insert[end, cur_end, cur_timestamp(s)]. For the range between "S" and "E," a replace operation of the form: insert[start, end, timestamp(s)] may be performed in step 742. Program flow may then terminate in step 744.

Recall that in step 734 a determination was made as to whether cur_end is less than or equal to start. If this condition is satisfied, the relationship between the ranges 802 and 804 may be shown as in FIG. 8F. In this case, it is possible that another existing entry in the data structure 600 overlaps the range 802. More particularly, because cur_end occurs before end, it is possible that another entry has a range that begins after start and that overlaps the range 802. Such an entry would not have been found using the find-largest(base) operation in step 704. For example, such an entry may have the range 804 as shown in FIG. 8B or 8C. Thus, to identify such an entry, a find-next(base) operation may be performed in step 746 using start as the base. This new entry will then take the place of the [cur_start, cur_end, cur_timestamp(s)] for further processing. From step 746, program flow returns to step 706 where the method 700 is essentially repeated for this newly identified entry. Note that in step 706 if the end-of-list indicator is returned, this indicates that the end of the list (i.e. a "no more data"

condition) has been reached and no such overlapping entry is present. Accordingly, program flow may terminate in step 748.

Recall also that in step 726, a determination was made as to whether end is greater than or equal to cur_end. If this condition is satisfied, the ranges 802 and 804 may be shown as in FIG. 8D. In this case, the timestamp for the range from "CE" to "E" may be updated in step 750 by performing a replace operation of the form: replace[cur_start, cur_end, timestamp(s)]. Then, because the range from "CE" to "E" remains, start may be set equal to cur_end in step 752. Program flow may then move to step 746 in which a find-next(base) operation may be used to determine whether any other entries overlap the remaining range between start and end.

Figure 8G:
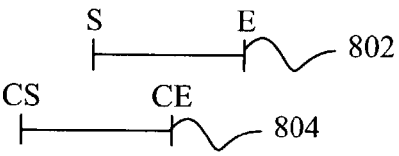
Figure 8H:
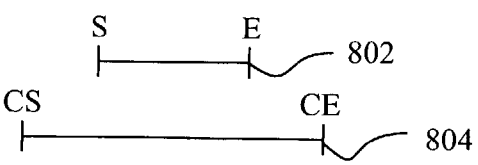

Recall also that in step 736, a determination was made as to whether cur_end is less than or equal to start. If this condition is satisfied, the ranges 802 and 804 may be as shown in FIG. 8G. In this case, the timestamp for the range from "CS" to "S" may be updated in step 754 by performing a replace operation of the form: replace[cur_start, start, cur_timestamp(s)]. The timestamp for the range from "S" to "CE" may be updated in step 756 by performing an insert operation of the form: insert[start, cur_end, timestamp(s)]. Then, because the range from "CE" to "E" remains, start may be set equal to cur_end in step 758. Program flow may then move to step 746 in which a find-next(base) operation may be used to determine whether any other entries overlap the remaining range between start and end.

This process continues until the program terminates in one of the end states 710, 718, 732, 744 or 748. In sum, the method of FIG. 7 identifies all the existing records in the data structure that possibly overlap with the entry to be added. If there are overlaps, the existing records are split such that the new timestamp is recorded for the updated data blocks and the existing timestamp is maintained for the existing data blocks. This process maintains the entries in the data structure 600 such that the ranges of data blocks do not overlap.

Thus, techniques have been described for managing timestamps in a computer system having multiple storage devices for storing redundant data.

It may be desired to assign data to storage devices such as the devices 102 of FIG. 1. Thus, in accordance with another aspect of the invention, techniques are provided for assigning data in a computer system having multiple storage devices for storing redundant data. A data "store," as used herein, may be data storage space, such as a logically contiguous block of storage, striped data storage or concatenated data storage, that is presented to an application (e.g., a software application). In practice, a store may be implemented as a logical volume into which data elements, such as data blocks, may be inserted, removed or manipulated.

Figure 9:
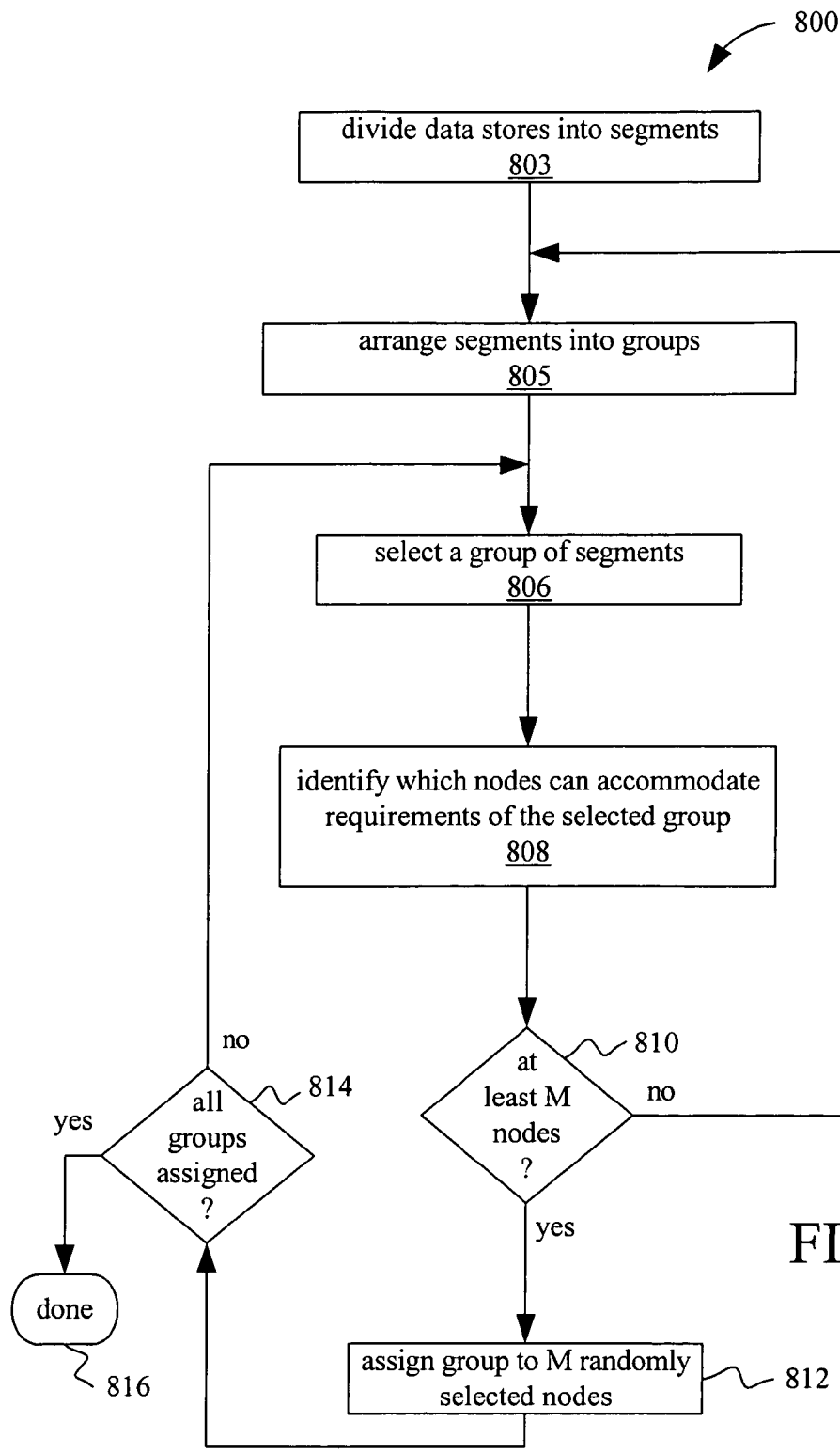
FIG. 9 illustrates a flow diagram of a method for assigning data stores to storage device nodes in accordance with an embodiment of the present invention.

FIG. 9 illustrates a flow diagram of a method 800 for assigning data stores to storage device nodes in accordance with an embodiment of the present invention. The method 800 may be implemented within the computer system 100 of FIG. 1. For example, a server 106 may include software and/or hardware that is appropriately configured to perform the method 800. It will be apparent, however, that the method 800 may be performed elsewhere, such as by a distributed application which operates at one or more of the storage devices 102, or the servers 106 or at least a portion of the method 800 may be performed manually. Further, one of the servers 106 may be designated as a metaserver that performs the method 800 and also controls the assignment of data to locations within the system 100.

Initially, the data stores to be assigned to the system 100 are broken into smaller elements. For example, in step 803, the data stores to be assigned to the system 100 may each be divided into a plurality of contiguous pieces, referred to as "segments." Each segment may be of a predetermined data capacity, such as 8 gigabytes per segment, though it will be apparent that another capacity or different capacities may be selected.

Then, in step 805, the segments may be arranged in groups, where each group includes a plurality of segments. The groups may each include a predetermined number of segments, such as 128 segments per group, though it will be apparent that another number or different numbers of segments may be assigned to each group.

In step 805, the segments may be grouped sequentially, according to their positions within the stores. Alternately, the segments may be assigned to groups based on load balancing considerations. For example, an expected data throughput (i.e. total accesses per unit time) may be known for each store. It may be assumed that each segment in the store will have a throughput that is proportionate to the relative capacities of the store and the segment. The segments may then be assigned to the groups, such that each group is expected to have a throughput that is equal to that of the other groups.

In step 806, a group is selected. A group may be selected in sequential order or randomly ("random" selection, as referred to herein, also encompasses pseudo-random selection). In step 808, storage device nodes 102 (FIG. 1) have sufficient resources available such that they are able to accommodate the selected group are identified. At a minimum, this includes identifying nodes 102 that have sufficient storage capacity, but may also be based on other parameters. For example, this may include identifying nodes 102 that have a sufficient quantity available of a performance parameter, such as data throughput capacity. This may also include identifying nodes that meet availability and reliability requirements. For example, the workload may require that all M nodes individually have a mean time between failure (MTTF) of greater than a million hours, or that the M nodes are physically located on separate racks.

Preferably, all such devices 102 that meet the capacity requirement, and possibly additional requirements, are identified in step 808.

As explained herein, data is stored redundantly in the system 100. For example, three or more replicas of each data block are stored in the system 100, where the number of replicas is equal to M. In step 810, a determination is made as to whether at least M nodes 102 were identified in step 808 as able to accommodate copies of the group selected in step 806. If not, this means that the required number M of replicas of the data for the group cannot be assigned to different nodes 102 in the system 100 unless the group is made smaller. The groups are generally divisible into smaller groups because each includes a plurality of segments. Thus, if the determination of step 810 is negative, step 805 may be repeated by further dividing the group so that the resulting group has lower requirements than previously. This may be accomplished by dividing the group into two or more smaller groups or by reassigning one or more of the segments of the group to a different group. Then, in a next pass through the step 808, it can be expected that there will be more nodes 102 that can accommodate the group than previously. This process is repeated until at least M nodes 102 are found that can accommodate the group.

Then, in step 812, the group is assigned to M nodes 102. If more than M nodes were identified in step 808, a subset of the identified nodes 102 is selected in step 812 for the group. This selection is preferably performed randomly. By performing this selection randomly for all of the groups, it is expected that the assignments of all of the groups will be balanced across the devices 102, reducing the incidence of "hotspots" in which storage operations are concentrated at a small number of the devices 102.

Once the group has been assigned, an entry into a data locations table is preferably made for keeping track of the assignments of the data stores to the nodes 102. FIG. 10 illustrates an exemplary table 900 for tracking assignments of data to storage device nodes 102 in accordance with an embodiment of the present invention. The table 900 may be maintained, for example, by one or more of the servers 106.

As shown in FIG. 10, the table 900 includes an identification of data (e.g., by data block) and its location (e.g., by storage device node 102). An exemplary entry 902 indicates that a group includes data blocks #1–180 and is assigned to be stored redundantly by node #3, node #7 and node #12. Similarly, an exemplary entry 904 indicates that a group including data blocks #181–257 is assigned to node #1, node #4 and node #9. In this manner, the table 900 indicates the locations of all of the data in the system 100. In the examples, the data is identified by its block identification. It will be apparent, however, that the data may be identified in another manner, such as by group or segment identification.

In step 814, a determination is made as to whether all of the groups have been assigned to the system 100. If not, the process described above is repeated by returning to step 806 in which a next group of segments is selected. Nodes are then identified for accommodating this next group in step 808 and when at least M nodes are identified in step 810, this group is assigned in step 812 to selected nodes 102 of the system 100. Once all of the groups have been assigned in this way, program flow may terminate in a step 816.

Thus, a technique has been described for assigning data to storage device nodes 102 in the system 100. In sum, this technique involves qualifying nodes 102 to determine whether they are able to accommodate a collection of data (e.g., a group of segments), and, then, randomly selecting from among those nodes 102 that are qualified. This technique combines aspects of a deterministic assignment (by qualifying the nodes) and random assignment (by randomly selecting from among qualified nodes). The deterministic aspect ensures that the nodes are appropriately qualified for an assignment before the assignment is made, which avoids potentially having to reassign data. As mentioned, the random aspect is expected to result in a balanced assignment. This aspect of the present invention thus contrasts with prior techniques that are either purely deterministic or purely random.

Figure 11:
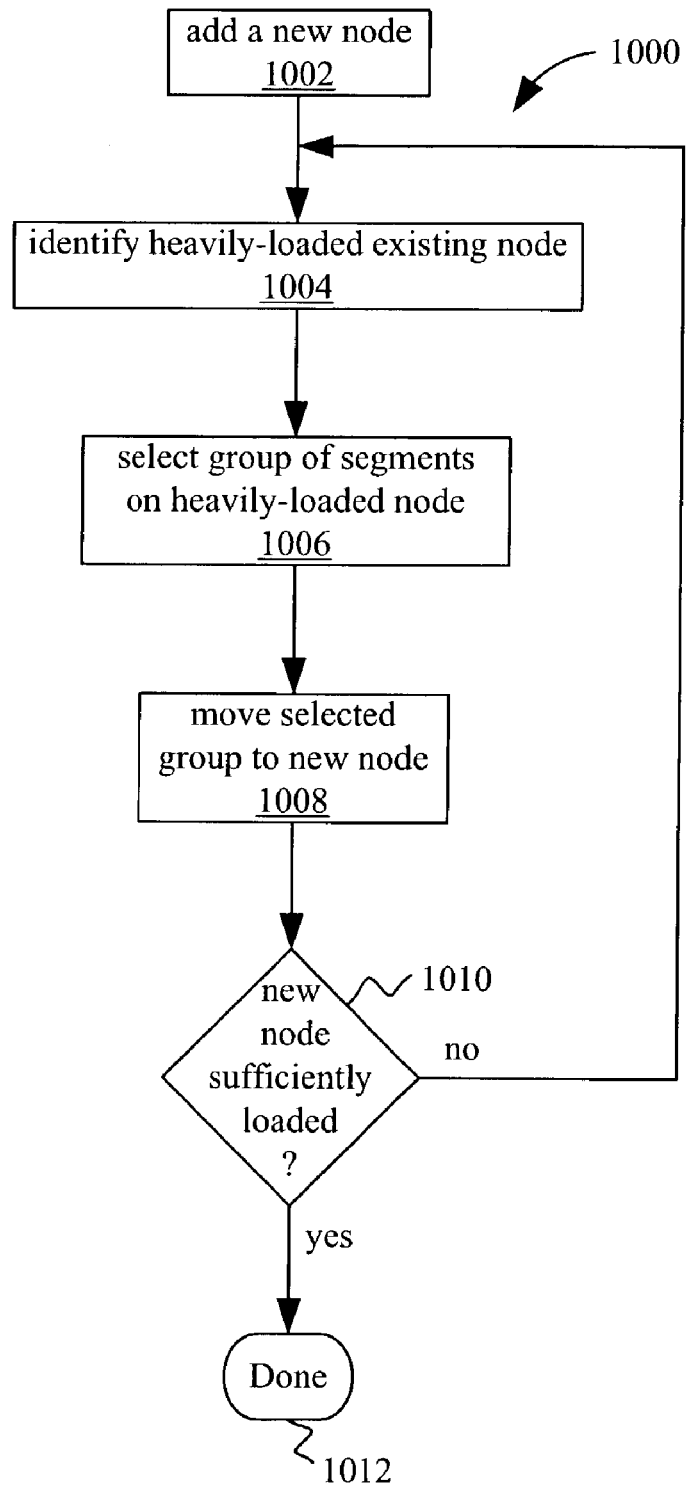
FIG. 11 illustrates a flow diagram of a method for adding a new storage device node and assigning data to the new node in accordance with an embodiment of the present invention.

FIG. 11 illustrates a flow diagram of a method 1000 for adding a new storage device node and assigning data to the new node in accordance with an embodiment of the present invention. This method 1000 may be performed, for example, after groups have been assigned to the system 100 (e.g., using method 800 of FIG. 9). At some point, it may be desired to add a node 102 to the system 100, such as to increase capacity or performance. Similarly to the method 800 of FIG. 9, the method 1000 may be performed by hardware and/or software within the system 100 of FIG. 1, though a portion may be performed manually.

In step 1002, a storage device node 102 is newly added to the system 100 of FIG. 1. Then, in step 1004, a heavily-loaded node previously existing in the system 100 is selected. For example, the node selected in step 1004 may have a highest utilization from among all of the nodes 102. For this purpose, the utilization of each node 102 determined as a ratio of the amount of a particular parameter is consumed by the workload for servicing the data currently assigned to the node compared to the total available level of the parameter at the node. For example, where a node has a total of 100 units of storage capacity and the current assignment of data to the node consumes 90 units of that storage capacity, the node can be said to have a utilization of ninety percent (90%). If no other node 102 in the system 100 has a capacity utilization greater than ninety percent, the node with ninety percent utilization may be selected in step 1006. It will be apparent, however, that amount of loading on each node may be determined based on parameters other than capacity (e.g., throughput) and that the amount of loading may be based on a combination of multiple parameters (e.g., by statistically averaging the utilization for multiple parameters).

In step 1008, a group of segments assigned to the existing node selected in step 1006 is selected and reassigned to the newly-added node. This may be accomplished, for example, by selecting the largest group assigned to the existing node, though the group may be selected based on another criterion, such as the group having the highest one or more performance requirements, such as throughput. The group may be selected in step 1008 based on availability of storage capacity or of other performance parameters at the newly-added node. For example, if the newly-added node has 50 units of storage capacity, a group that requires less than 50 units of capacity is selected in step 1006. In addition, the table 900 (FIG. 10) is preferably updated to reflect this assignment.

Then, in step 1010, a determination is made as to whether the newly-added node is now sufficiently loaded. For example, the amount of loading determined in for each existing node in step 1004 (e.g., capacity utilization or utilization for a combination of parameters) may be determined for the newly-added node. This loading may then be compared to an average (e.g., a statistical mean or median) loading for all the other nodes and if the loading of the newly-added node is at least as great as the average loading, then the newly-added node may be considered sufficiently loaded in step 1010. It will be apparent, however, that the sufficiency of loading of the newly-added node may be determined in other ways. For example, its loading may be compared to a range bounded by the lowest and highest loading of the existing nodes such that its loading is considered sufficient if it falls within this range.

Preferably, the loading of the existing nodes is determined taking into account the reassignment of groups in the newly-added node. Thus, where a group is reassigned from an existing node, its loading will generally be reduced. To take this reduced loading into account, the loading for this node may then be recomputed.

If the loading for the newly-added node is determined in step 1010 is based on parameters other than storage capacity, the newly-added node will also be considered sufficiently loaded of the storage capacity required for the data assigned to it exceeds a predetermined portion (e.g., ninety percent) of its total storage capacity. For example, if the throughput utilization of the newly-added node is lower than any of the existing nodes, but its storage capacity utilization is over ninety-percent, the node will be considered sufficiently loaded.

If the newly-added node is determined in step 1010 to be not sufficiently loaded, the steps of identifying a heavily-loaded node (step 1004), selecting a data at the heavily-loaded node (step 1006) and reassigning the selected data (step 1008) are repeated until the newly-added node is sufficiently loaded. Because the reduced loading of any node from which a group has been reassigned is preferably taken into account after the group has been reassigned to the newly-added node, the existing node identified in each pass through the step 1004 will generally be different from the node identified in the prior pass through the step 1004.

Once the newly-added node is sufficiently loaded, the method 1000 of FIG. 11 may terminate in a step 1012. Thus, a technique has been described for adding a storage device nodes to the system 100 and reassigning data to the newly added node.

Figure 12:
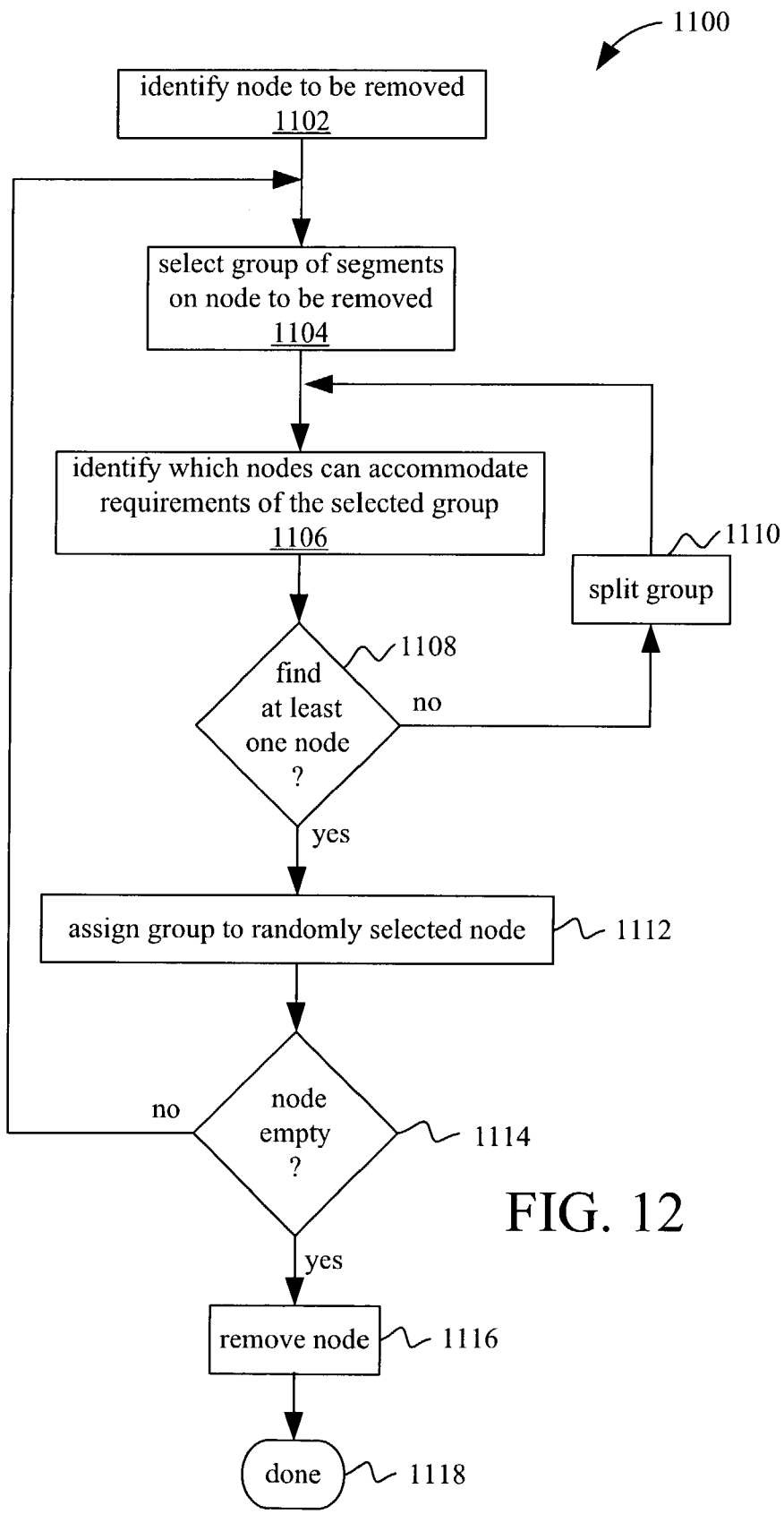
FIG. 12 illustrates a flow diagram of a method for removing a storage device node in accordance with an embodiment of the present invention.

At some point, it may be desired to remove data from a node in the system 100. For example, a node may develop a fault or may become obsolete over time and, thus, the node may need to be taken out of service or removed. FIG. 12 illustrates a flow diagram of a method 1100 for removing data from a storage device node in accordance with an embodiment of the present invention. Similarly to the methods 800 and 1000 of FIGS. 9 and 11, the method 1100 may be performed by hardware and/or software within the system 100 of FIG. 1, though a portion may be performed manually.

In a step 1102, a node 102 existing in the system 100 is selected for removal. In step 1104, a group of segments stored at the node selected in step 1102 are selected for reassignment to another, existing node. Then, in step 1106, storage device nodes 102 that are able to accommodate the selected group are identified. Similarly, to step 808 of FIG. 9, at a minimum, this includes identifying nodes 102 that have sufficient storage capacity, but may also be based on sufficiency of other parameters. For example, this may include identifying nodes 102 that have a sufficient quantity available of a performance parameter, such as data throughput capacity. Preferably, all such devices 102 that meet the capacity requirement, and possibly additional requirements, are identified in step 1106.

In step 1108, a determination is made as to whether at least one node was identified in step 1106. If not, this means that the data for the group cannot be assigned to an existing node 102 in the system 100 unless the group is made smaller. As mentioned, the groups are generally divisible into smaller groups because each includes a plurality of segments. Thus, if the determination of step 1108 is negative, the group may then be split into two or more smaller groups in step 1110 so that the resulting groups have lower requirements than previously. Then, in a next pass through the step 1106 for each of these smaller groups, it can be expected that there will be more nodes 102 that can accommodate the group than previously. This process is repeated until at least one node is found that can accommodate the group.

Then, in step 1112, if one node was identified in step 1106, the group is moved to the identified node. If more than one node was identified, one of nodes is selected from among those identified. Similarly to step 812 of the method 900, this selection is preferably performed randomly. In addition, the table 900 (FIG. 10) is preferably updated to reflect this assignment.

In step 1114, a determination is made as to whether all of groups at the node to be removed have been reassigned. If any groups remain, the steps of selecting a group (step 1104), identifying which nodes 102 can accommodate the group (step 1106), splitting the group if necessary (step 1110) and reassigning the group (step 1112) may then be repeated until all of the groups have been reassigned.

Once all of the groups have been reassigned, the node may be removed in step 1116 if desired. Program flow may then terminate in a step 1118. Thus, a technique has been described for removing data from a storage device node in the system 100 and reassigning data from the node to existing nodes.

It will be apparent that modifications may be made to the techniques for data assignment described herein. For example, as described, selecting the set of M nodes in FIG. 9 and a node in FIG. 12 essentially includes selecting all nodes that meet the workload requirements and then selecting the required number of nodes (i.e. a set of M nodes for FIG. 9 or a node for FIG. 12) from these. Alternatively, a number of nodes (the required number or a greater number) may be randomly selected. Then, a determination may be made as to whether they meet requirements for the group of segments. If so, the assignment may be made (if more than one assignment is possible, random selection may be employed to select from among those). If not, the steps of randomly selecting and determining may be repeated until nodes are identified that meet the requirements. If there is not success after a predetermined number of cycles, the group may be split and the process repeated. Further, combinations of these techniques may be implemented. For example, all nodes that meet a subset of requirements may be selected. Then, M nodes out of these repeatedly and randomly selected from these until a set that meets all the requirements is found.

While the foregoing has been with reference to particular embodiments of the invention, it will be appreciated by those skilled in the art that changes in these embodiments may be made without departing from the principles and spirit of the invention, the scope of which is defined by the following claims.

What is claimed is:

1. A system for redundant storage of data comprising:
   a plurality of storage devices and a communication medium for interconnecting the storage devices;
      wherein at least two of the storage devices are designated storage devices for storing a block of data; and
      wherein each designated storage device stores:
         a version of the data; and
         a first timestamp that is indicative of when the version of
         data was last updated; and
         a second timestamp that is indicative of a pending update to
         the block of data;
      wherein when the update to the block of data is completed at one of the designated storage devices, the one of the designated storage devices discards the second timestamp.

2. The system according to claim 1, wherein one of the storage devices acts as coordinator for a data update operation, and wherein the coordinator instructs the storage device to discard the second timestamp.

3. The system according to claim 1, wherein one of the storage devices acts as coordinator for a data update operation, and wherein the coordinator instructs the device to discard the first timestamp.

4. The system according to claim 1, wherein the designated storage devices each store a plurality of blocks of data and also store timestamps corresponding to ranges of the data blocks in a data structure.

5. The system according to claim 4, further comprising non-volatile memory at each designated storage device for storing the data structure.

6. The system according to claim 4, wherein at least some entries in the data structure correspond to a range of data blocks chat share a common timestamp.

7. The system according to claim 4, wherein each designated storage device inserts entries into the data structure such that the ranges do not overlap.

8. The system according to claim 7, wherein each designated storage device inserts a new entry to be added to the data structure by determining whether an existing entry in the data structure has a range that overlaps the range of the entry to be added and if an existing entry in the data structure has a range that does not overlap the range of the entry to be added, inserting the entry to be added at the identified position.

9. The system according to claim 8, wherein if an existing entry in the data structure has a range that overlaps the range of the entry to be added, the designated storage device identifies an existing entry in the data structure having a range that overlaps the range of the entry to be added and replaces the existing entry with one or more new entries including a new entry for any portion of the range of the existing entry that is not overlapped by the entry to be added, the new entry for the portion of the existing entry not overlapped having the timestamp of the existing entry, and the one or more new entries further including an entry for the portion of the range of the entry to be added that overlaps the range of the existing entry, the entry for the portion that overlaps having the timestamp of the entry to be added.

10. A system for redundant storage of data comprising:
a plurality of storage devices and a communication medium for interconnecting the storage devices, wherein at least two of the storage devices are designated devices for storing a plurality of blocks of data, wherein each designated storage device stores:
the plurality of blocks of data;
a first timestamp for each block of data that is indicative of when the data was last updated and, when a plurality of the blocks of data are updated concurrently, the first timestamp corresponds to a range of the data blocks; and
a second timestamp for a subset of the blocks of data indicating a pending update, when the pending update is completed, the designated storage device discards the second timestamp.

11. The system according to claim 10, wherein the timestamps are arranged according to a data structure.

12. The system according to claim 11, further comprising non-volatile memory at each designated storage device for storing the data structure.

13. The system according to claim 11, wherein at least some of the entries in the data structure correspond to a range of data blocks that share a common timestamp.

14. The system according to claim 13, wherein each designated storage device inserts entries into the data structure such that the ranges do not overlap.

15. The system according to claim 14, wherein each designated storage device inserts a new entry to be added to the data structure by determining whether an existing entry in the data structure has a range that overlaps the range of the entry to be added and if an existing entry in the data structure has a range that does not overlap the range of the entry to be added, inserting the entry to be added at the identified position.

16. The system according to claim 15, wherein if an existing entry in the data structure has a range that overlaps the range of the entry to be added, the designated storage device identifies an existing entry in the data structure having a range that overlaps the range of the entry to be added and replaces the existing entry with one or more new entries including a new entry for any portion of the range of the existing entry that is not overlapped by the entry to be added, the new entry for the portion of the existing entry not overlapped having the timestamp of the existing entry, and the one or more new entries further including an entry for the portion of the range of the entry to be added that overlaps the range of the existing entry, the entry for the portion that overlaps having the timestamp of the entry to be added.

17. The system according to claim 16, wherein if an additional existing entry in the data structure has a range that overlaps the range of the entry to be added, the additional existing entry is replaced with one or more new entries.

* * * * *

UNITED STATES PATENT AND TRADEMARK OFFICE
CERTIFICATE OF CORRECTION

| | | |
|---|---|---|
| PATENT NO. | : 7,152,077 B2 | Page 1 of 1 |
| APPLICATION NO. | : 10/440531 | |
| DATED | : December 19, 2006 | |
| INVENTOR(S) | : Alistair Veitch et al. | |

It is certified that error appears in the above-identified patent and that said Letters Patent is hereby corrected as shown below:

In column 22, line 67, in Claim 6, delete "chat" and insert -- that --, therefor.

Signed and Sealed this

Twenty-eighth Day of April, 2009

JOHN DOLL
*Acting Director of the United States Patent and Trademark Office*